United States Patent
Hayashi et al.

(10) Patent No.: US 7,233,480 B2
(45) Date of Patent: *Jun. 19, 2007

(54) CAPACITOR AND METHOD FOR MANUFACTURING THE SAME

(75) Inventors: Kazuhiro Hayashi, Aichi (JP); Akifumi Tosa, Aichi (JP); Motohiko Sato, Aichi (JP); Jun Otsuka, Aichi (JP); Manabu Sato, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/475,891

(22) Filed: Jun. 28, 2006

(65) Prior Publication Data

US 2006/0245142 A1    Nov. 2, 2006

Related U.S. Application Data

(63) Continuation of application No. 11/003,767, filed on Dec. 6, 2004, now Pat. No. 7,072,169.

(30) Foreign Application Priority Data

Dec. 5, 2003    (JP)    ............................. 2003-407327

(51) Int. Cl.
*H01G 4/228*    (2006.01)

(52) U.S. Cl. ................................ 361/306.3; 361/306.1; 361/321.1; 361/321.2; 361/303; 361/311; 361/313

(58) Field of Classification Search ............. 361/306.3, 361/306.1, 306.2, 302–305, 311–313, 321.2, 361/321.4, 321.5, 321.1, 303
See application file for complete search history.

(56) References Cited

U.S. PATENT DOCUMENTS

| 4,328,530 | A |  | 5/1982 | Bajorek et al. |  |
|---|---|---|---|---|---|
| 5,835,338 | A |  | 11/1998 | Suzuki et al. |  |
| 5,880,925 | A | * | 3/1999 | DuPre et al. | ................ 361/303 |
| 6,034,864 | A |  | 3/2000 | Naito et al. |  |
| 6,052,272 | A | * | 4/2000 | Kuroda et al. | ............... 361/303 |
| 6,346,743 | B1 | * | 2/2002 | Figueroa et al. | ............ 257/723 |

(Continued)

FOREIGN PATENT DOCUMENTS

EP    0 917 165 A2    5/1999

(Continued)

*Primary Examiner*—Nguyen T. Ha
(74) *Attorney, Agent, or Firm*—Sughrue Mion, PLLC

(57) ABSTRACT

A laminated ceramic capacitor (10) divided into a first laminate (11), a second laminate (12), a third laminate (13), and a fourth laminate (14). The first laminate (11) includes a ceramic layer (15) serving as a dielectric layer. The ceramic layer (15) is thicker than a ceramic layer (17) sandwiched between internal electrodes (16*a*) in the second laminate (12) or the fourth laminate (14), and thinner than 20 times the thickness of the ceramic layer (17). The third laminate (13) includes dielectric layers, which serve as the ceramic layers (17), and has a thickness of 5% of the total thickness of the second laminate (12) and the fourth laminate (14). Accordingly, the third laminate (13) achieves the function of absorbing an electrode-induced thickness differential. Also, by means of regulating the thickness of the first laminate (11), portions of via electrodes (18) that extend without being electrically connected to the internal electrodes (16*b*) can be shortened.

21 Claims, 10 Drawing Sheets

U.S. PATENT DOCUMENTS

| | | |
|---|---|---|
| 6,370,011 B1 | 4/2002 | Naito et al. |
| 6,407,904 B1 * | 6/2002 | Kuroda et al. .............. 361/303 |
| 6,462,932 B1 | 10/2002 | Naito et al. |
| 6,496,354 B2 | 12/2002 | Naito et al. |
| 6,549,395 B1 | 4/2003 | Naito et al. |
| 6,556,416 B2 * | 4/2003 | Kunihiro ................... 361/277 |
| 6,606,237 B1 | 8/2003 | Naito et al. |
| 6,678,145 B2 * | 1/2004 | Naito et al. .............. 361/308.1 |
| 6,678,927 B1 | 1/2004 | Retseptor |
| 6,905,936 B2 * | 6/2005 | Murakami et al. .......... 438/381 |

FOREIGN PATENT DOCUMENTS

| | | |
|---|---|---|
| EP | 0917165 A2 | 5/1999 |
| JP | 11-204372 A | 7/1999 |
| JP | 2002-359141 A | 12/2002 |
| JP | 2002-359149 | 12/2002 |
| JP | 2003-158030 A | 5/2003 |
| JP | 2004-172602 A | 6/2004 |

* cited by examiner

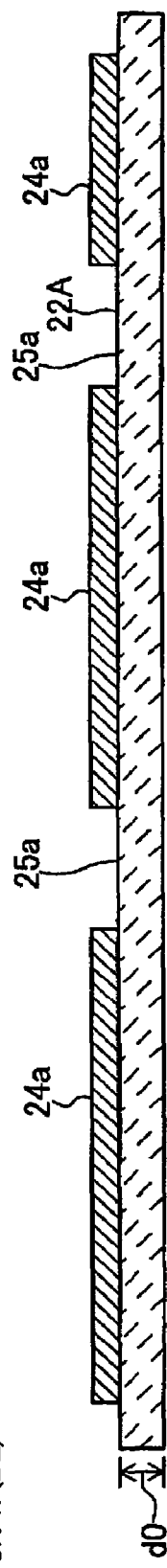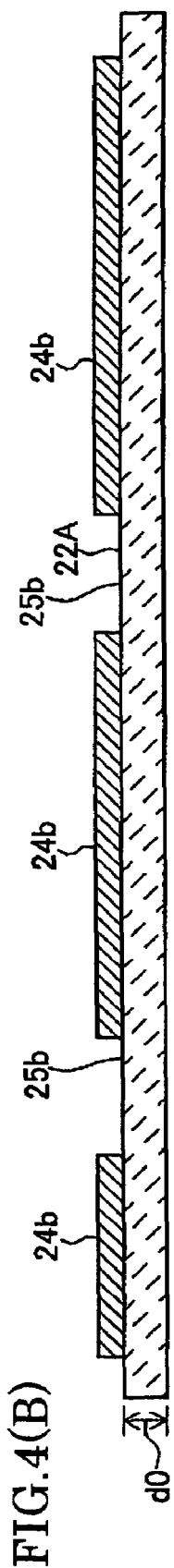

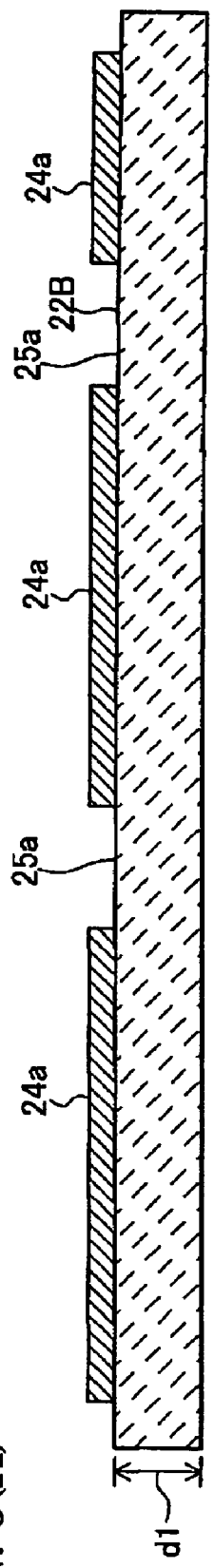
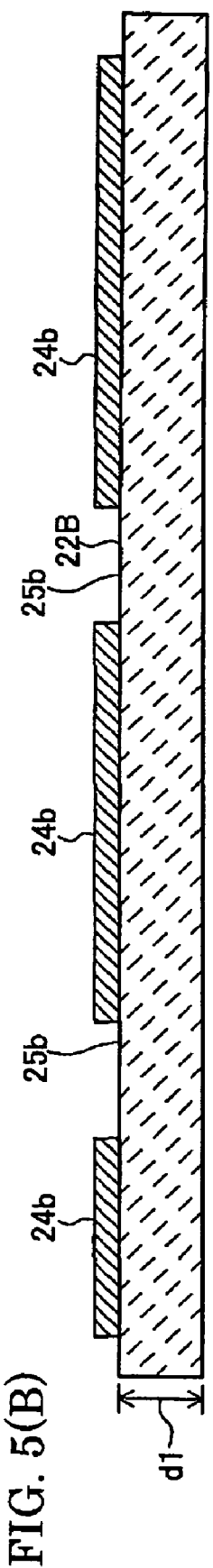

CAPACITOR AND METHOD FOR MANUFACTURING THE SAME

CROSS-REFERENCE TO RELATED APPLICATION

This application is a Continuation of U.S. application Ser. No. 11/003,767 filed Dec. 6, 2004, now U.S. Pat. No. 7,072,169, the above-noted application incorporated herein by reference in its entirety.

BACKGROUND OF THE INVENTION

1. Field of the Invention

The present invention relates to a capacitor in which internal electrodes are arranged in layers with a dielectric layer sandwiched between opposed internal electrodes. More particularly, the invention relates to a laminated capacitor or rather multilayer capacitor using via electrodes for electrically interconnecting individual terminal electrodes and internal electrodes.

2. Description of the Related Art

In a multilayer capacitor, first electrode layers and second electrode layers serve as the internal electrodes; the dielectric layer is sandwiched between the opposed first and second electrode layers; and a large number of via electrodes are provided so as to extend or rather penetrate through the dielectric layers in the laminating direction of the first and second electrode layers and electrically interconnect the first electrode layers and the second electrode layers, respectively (refer to, for example, Patent Documents 1 and 2 below). Such a multilayer capacitor is considered to be suitable for use as, for example, a decoupling capacitor for reducing power noise of an IC.

[Patent Document 1] Japanese Patent Laid-Open (kokai) No. 2002-359141

[Patent Document 1] Japanese Patent Laid-Open (kokai) No. 2003-158030

Such a capacitor must have high capacitance and low inductance. Generally, to meet this requirement, internal electrodes are arranged in layers. A single dielectric layer has a portion where an electrode is formed, and a portion where the electrode is not formed. Accordingly, when such dielectric layers are laminated in order to arrange the electrodes in layers, a thickness differential (electrode-induced thickness differential) or so called an electrode step (or an electrode height difference) arises in the capacitor between an electrode-containing portion and a portion not containing electrodes. In order to absorb such an electrode-induced thickness differential, a thick dielectric layer portion, which is generally called a "base layer," is provided on the surface of the capacitor. In order to absorb the electrode-induced thickness differential, the base layer is formed relatively thick.

3. Problems to be Solved by the Invention

However, the above-mentioned conventional capacitor gives rise to the following problem.

In the above-mentioned multilayer capacitor having via electrodes, the via electrodes extend through the base layer and are electrically connected to the internal electrodes which underlie the base layer. Accordingly, each of the via electrodes includes a portion that extends across the thickness direction of the base layer and is not electrically connected to the internal electrodes.

In recent years, the processing speed of an IC used with a capacitor has increased, and thus a decoupling capacitor requires further reduction in inductance. However, inductance is increased by via electrodes each having a long portion that extends without being electrically connected to internal electrodes as mentioned above. Inductance increases with the thickness of the base layer. An increase in inductance hinders an improvement in electrical characteristics of the multilayer capacitor, particularly at high frequencies. Such a problem can be solved or suppressed by reducing the thickness of the base layer. However, reduction in the thickness of the base layer is limited, in view of the above-mentioned absorption of electrode-induced thickness differential. Therefore, reducing the thickness of the base layer is not a practical solution.

SUMMARY OF THE INVENTION

The present invention has been achieved to solve the aforementioned problems, and an object of the present invention is to achieve both absorption of electrode-induced thickness differential and a reduction in inductance with respect to a multilayer capacitor in which internal electrodes are arranged in layers.

The above object of the present invention has been achieved by providing a capacitor which comprises an electrode laminate portion, a first dielectric portion, and a second dielectric portion. The electrode laminate portion comprises internal electrodes arranged in layers with a dielectric layer sandwiched between opposed internal electrodes, and is configured such that the first electrode layers, second electrode layers, and interelectrode dielectric layers are laminated. The first electrode layers and the second electrode layers serve as the internal electrodes. The interelectrode dielectric layers serve as the dielectric layers sandwiched between the first and second electrodes. The first dielectric portion comprises a dielectric layer and overlies the electrode laminate portion on a side toward the front surface of the capacitor. The second dielectric portion comprises a dielectric layer and overlies the electrode laminate portion while being located away from the first dielectric portion such that at least a partial range of the electrode laminate portion in which the first and second electrode layers and the interelectrode dielectric layers are laminated intervenes between the first dielectric portion and the second dielectric portion. In other words, the entirety or at least a part of the electrode laminate portion is sandwiched between the first dielectric portion and the second dielectric portion. Via electrodes are formed so as to extend from the first dielectric portion in the laminating direction of the internal electrodes, and electrically interconnect the internal electrodes.

In the thus-configured capacitor of the present invention, the second dielectric portion is of a thickness which contributes toward mitigating the thickness differential that arises in the electrode laminate portion as a result of lamination of the first and second electrode layers; and the first dielectric portion is of a thickness which contributes toward reducing the inductance of the capacitor.

Accordingly, in the capacitor of the present invention, the second dielectric portion functions as does the base layer in a conventional capacitor; i.e., the second dielectric portion is thick and thus performs the function of absorbing an electrode-induced thickness differential. The second dielectric portion and the first dielectric portion located on a side toward the front surface of the capacitor sandwich the electrode laminate portion. Furthermore, the thickness of the first dielectric portion, which overlies the electrode laminate portion on a side toward the front surface of the capacitor, is regulated as specified above, whereby those portions of the via electrodes that extend without being electrically connected to internal electrodes of the electrode laminate portion can be shortened. As a result, the capacitor of the present invention can achieve low inductance while an electrode-induced thickness differential arising as a result of lamination of internal electrodes is absorbed.

When the second dielectric portion has a thickness of at least 5% of the overall thickness of the electrode laminate portion, the above-mentioned contribution toward mitigating the thickness differential is ensured. When the first dielectric portion is thicker than a single interelectrode dielectric layer intervening between internal electrodes in the electrode laminate portion and thinner than 20 times the thickness of a single interelectrode dielectric layer, its contribution to mitigation of the thickness differential is ensured.

The second dielectric portion can be formed so as to be present interveningly in the electrode laminate portion while being biased toward the front surface of the capacitor. The electrode laminate portion can comprise a partial laminate located at a position biased toward the front surface of the capacitor, and a residual laminate located at a position biased toward the back surface of the capacitor.

Preferably, the second dielectric portion is thicker than the partial laminate. Preferably, the thickness of the second dielectric portion is not greater than ⅓ the overall thickness of the capacitor. Preferably, the thickness of the partial laminate is not greater than 20% the overall thickness of the capacitor. Herein, the "overall thickness of the capacitor" represents the thickness of the capacitor along the laminating direction. The "thickness of the laminate" represents the thickness of the laminate along the laminating direction.

The capacitance of the partial laminate is desirably smaller than that of the residual laminate. When a voltage drop arises in a semiconductor device (IC) due to simultaneous switching among devices, first, the partial laminate located near the IC supplies power to the IC. Since the partial laminate supplies power at high speed by virtue of its low-inductance characteristic, in spite of its low capacitance, the partial laminate yields sufficient effect at an initial stage of the voltage drop. Then, the residual laminate having high capacitance supplies power to the IC, thereby effectively suppressing noise which could otherwise result from the voltage drop. In other words, a single multilayer capacitor can perform effective decoupling. The thickness of the partial laminate is preferably not greater than 20%, more preferably not greater than 10%, than the overall thickness of the capacitor. Also, the thickness of the partial laminate is preferably not greater than half, more preferably not greater than 25%, that of the residual laminate. The capacitance of the partial laminate is preferably not greater than half, more preferably not greater than 25%, that of the residual laminate.

When providing a high capacitance is a primary consideration, the thus-configured capacitor of the present invention can be embodied as described below. For example, the second dielectric portion may also be configured to include laminated dielectric layers, the respective dielectric layers being sandwiched between internal electrodes such that each of the dielectric layers is thicker than a single dielectric layer sandwiched between internal electrodes in the electrode laminate portion, and wherein the second dielectric portion and the first dielectric portion are located on a side toward the front surface of the capacitor sandwich the electrode laminate portion. Via electrodes electrically interconnect the internal electrodes of the second dielectric portion. In other words, the capacitor is embodied as follows: the second dielectric portion comprises dielectric layers each being thicker than a single interelectrode dielectric layer in the electrode laminate portion; at least part of the respective dielectric layers are sandwiched between opposed third and fourth electrode layers, the third and fourth electrode layers serving as internal electrodes; and via electrodes are formed so as to electrically connect the third electrode layers together and the fourth electrode layers together in the second dielectric portion, the third and fourth electrode layers serving as internal electrodes. The opposed internal electrodes in the second dielectric portion can contribute toward increasing the capacitance of the capacitor; and the second dielectric portion performs the function of absorbing an electrode-induced thickness differential.

To achieve the above object, in a second aspect the present invention also provides a capacitor including an electrode laminate portion in which a plurality of internal electrodes are arranged in layers with a dielectric layer sandwiched between opposed internal electrodes, and configured such that via electrodes formed so as to extend in the laminating direction of the internal electrodes electrically interconnect the internal electrodes. The capacitor comprises a first dielectric portion comprising a dielectric layer; and a second dielectric portion comprising a dielectric layer. In the capacitor, the electrode laminate portion is configured such that first electrode layers, second electrode layers, and interelectrode dielectric layers are laminated, the first electrode layers and the second electrode layers serving as internal electrodes, and the interelectrode dielectric layers serving as dielectric layers sandwiched between the first and second electrodes; the first dielectric portion overlies the electrode laminate portion on a side toward the front surface of the capacitor; the second dielectric portion is present interveningly in the electrode laminate portion while being biased toward the front surface of the capacitor; the electrode laminate portion comprises a partial laminate located at a position biased toward the front surface of the capacitor, and a residual laminate located at a position biased toward a back surface of the capacitor; and the via electrodes comprise first via electrodes and second via electrodes and are formed so as to extend from the first dielectric portion, through the first electrode layers and through the second electrode layers in the electrode laminate portion, the first and second electrode layers serving as internal electrodes.

Thus, according to the above second aspect of the present invention, the second dielectric portion reduces those portions of the via electrodes extending in the first dielectric portion and which contribute toward increasing inductance, and can absorb electrode-induced thickness differential. The electrode laminate portion comprises the partial laminate located at a position biased toward the front surface of the capacitor, and the residual laminate located at a position biased toward the back surface of the capacitor, whereby the decoupling effect can be achieved more effectively.

The via electrodes can be through via electrodes that extend through the electrode laminate portion, which comprises the partial laminate and the residual laminate. Such a structure is effective for reducing inductance by virtue of cancellation of magnetic fields among the via electrodes. The effect of reducing inductance is enhanced when substantially all of the via electrodes (at least half the via electrodes) extend through the electrode laminate portion.

When the thick dielectric layers laminated in the second dielectric portion are formed from a dielectric material having the same thickness as that of the dielectric layers, manufacturing is facilitated.

Terminals connected to corresponding via electrodes can be formed on the surface of the first dielectric portion. This facilitates the connection of leads to the corresponding via electrodes and the connection of the capacitor to a component to be mounted, by way of the terminals.

In this case, by use of via electrodes extending through the capacitor, terminals connected to the corresponding via electrodes can be formed on the side of the capacitor opposite the first dielectric portion (on the back surface of the capacitor).

The above-described capacitor of the present invention can assume not only an independent form but also a combined form where the capacitor is joined to an electronic device or the like. Examples of such forms include a capacitor joined to a semiconductor device wherein the above-described capacitor is connected, on a side associated with the first dielectric portion, to the semiconductor device such that the via electrodes of the capacitor are electrically connected to the semiconductor device; a capacitor united with a wiring board wherein the above-described capacitor is connected, on a side associated with the first dielectric portion, to the wiring board having conductor lines including power lines and ground lines, such that the via electrodes of the capacitor are electrically connected to the wiring board; and a capacitor united with a substrate wherein the above-described capacitor is connected, on a side opposite the first dielectric portion (on the back surface of the capacitor), to the substrate having conductor lines including power lines and ground lines, such that the via electrodes of the capacitor are electrically connected to the substrate. The capacitor can also assume a form where a semiconductor and a substrate are connected to the capacitor on corresponding opposite sides thereof.

A first method of the present invention for manufacturing the above-described capacitor is a method for manufacturing a capacitor including an electrode laminate portion in which a plurality of internal electrodes are arranged in layers with a dielectric layer sandwiched between opposed internal electrodes, and configured such that via electrodes formed so as to extend in the laminating direction of the internal electrodes electrically interconnect the internal electrodes (i.e., electrically connect together internal electrodes of the same type). The method comprises:

a step (1) of forming a first dielectric portion from a dielectric material thicker than a single dielectric layer intervening between the internal electrodes in the electrode laminate portion;

a step (2) of laminating internal-electrode formation materials, which are to become the internal electrodes, such that the internal-electrode formation material which is to become a first electrode layer alternates with the internal-electrode formation material which is to become a second electrode layer while a dielectric material which is to become the dielectric layer is sandwiched therebetween, so as to form a partial laminate which is to become a portion of the electrode laminate portion, and overlaying the partial laminate on the first dielectric portion;

a step (3) of overlaying on the partial laminate, as a second dielectric portion, a dielectric material which is to become a dielectric layer;

a step (4) of laminating the internal-electrode formation materials, which are to become the internal electrodes, such that the internal-electrode formation material which is to become the first electrode layer alternates with the internal-electrode formation material which is to become the second electrode layer while the dielectric material which is to become the dielectric layer is sandwiched therebetween, so as to form a residual laminate which is to become a residual portion of the electrode laminate portion, and overlaying the residual laminate on the second dielectric portion; and a step (5) of forming through holes each extending through the first electrode layers, and through holes each extending through the second electrode layers, in the partial laminate and the residual laminate in a laminated assembly of the first dielectric portion, the partial laminate, the second dielectric portion, and the residual laminate; and charging a conductive paste into the through holes.

In this case, steps (1) and (3) can be performed as follows. In the step (1), the first dielectric portion is formed from a dielectric material which is to become a dielectric layer thinner than 20 times the thickness of a single dielectric layer intervening between the internal electrodes in the electrode laminate portion. In step (3), the dielectric material has a thickness of at least 5% the overall thickness of the electrode laminate portion.

Also, the steps (3) and (5) can be performed as follows. In the step (3), a dielectric material is prepared that is thicker than the dielectric material used in the formation of the partial laminate and the residual laminate; and the internal-electrode formation materials, which are to become the internal electrodes, are laminated such that the internal-electrode formation material which is to become a third electrode layer alternates with the internal-electrode formation material which is to become a fourth electrode layer while the thick dielectric material is sandwiched therebetween, so as to form the second dielectric portion. In step (5), through holes can be formed each extending through the first electrode layers in the partial laminate and the residual laminate and through the third electrode layers in the second dielectric portion, as well as through holes each extending through the second electrode layers in the partial laminate and the residual laminate and through the fourth electrode layers in the second dielectric portion.

A second method of the present invention for manufacturing the above-described capacitor is a method for manufacturing a capacitor including an electrode laminate portion in which a plurality of internal electrodes are arranged in layers with a dielectric layer sandwiched between opposed internal electrodes, and configured such that via electrodes formed so as to extend in a laminating direction of the internal electrodes electrically interconnect the internal electrodes. The method comprises:

a step (1) of forming a first dielectric portion from a dielectric material thicker than a single dielectric layer intervening between the internal electrodes in the electrode laminate portion;

a step (2) of laminating internal-electrode formation materials, which are to become the internal electrodes, such that the internal-electrode formation material which is to become a first electrode layer alternates with the internal-electrode formation material which is to become a second electrode layer while a dielectric material which is to become the dielectric layer is sandwiched therebetween, so as to form a laminate which is to become the entire electrode laminate portion, and overlaying the laminate on the first dielectric portion;

a step (3) of overlaying on the laminate, as a second dielectric portion, a dielectric material which is to become a dielectric layer; and a step (4) of forming through holes each extending from the first dielectric portion and through the first electrode layers, and through holes each extending from the first dielectric portion and through the second electrode layers, in the laminate in a laminated assembly of the first dielectric portion, the laminate, and the second dielectric portion; and charging a conductive paste into the through holes.

In this case, steps (1) and (3) can be performed as follows. In step (1), the first dielectric portion is formed from a dielectric material which is to become a dielectric layer thinner than 20 times the thickness of a single dielectric layer intervening between the internal electrodes in the electrode laminate portion. In the step (3), the dielectric material has a thickness of at least 5% the overall thickness of the electrode laminate portion.

The above methods can readily provide a capacitor in which, while an electrode-induced thickness differential is absorbed, portions of via electrodes that extend without being electrically connected to internal electrodes are shortened, to thereby reduce inductance.

BRIEF DESCRIPTION OF THE DRAWINGS

FIGS. 4(A) and 4(B) are explanatory views illustrating the procedure of FIG. 3 with respect to the second and fourth laminate 11.

FIGS. 5(A) and 5(B) are explanatory views for illustrating the procedure of FIG. 3 with respect to a third laminate 12.

DESCRIPTION OF REFERENCE NUMERALS

Figure 1:
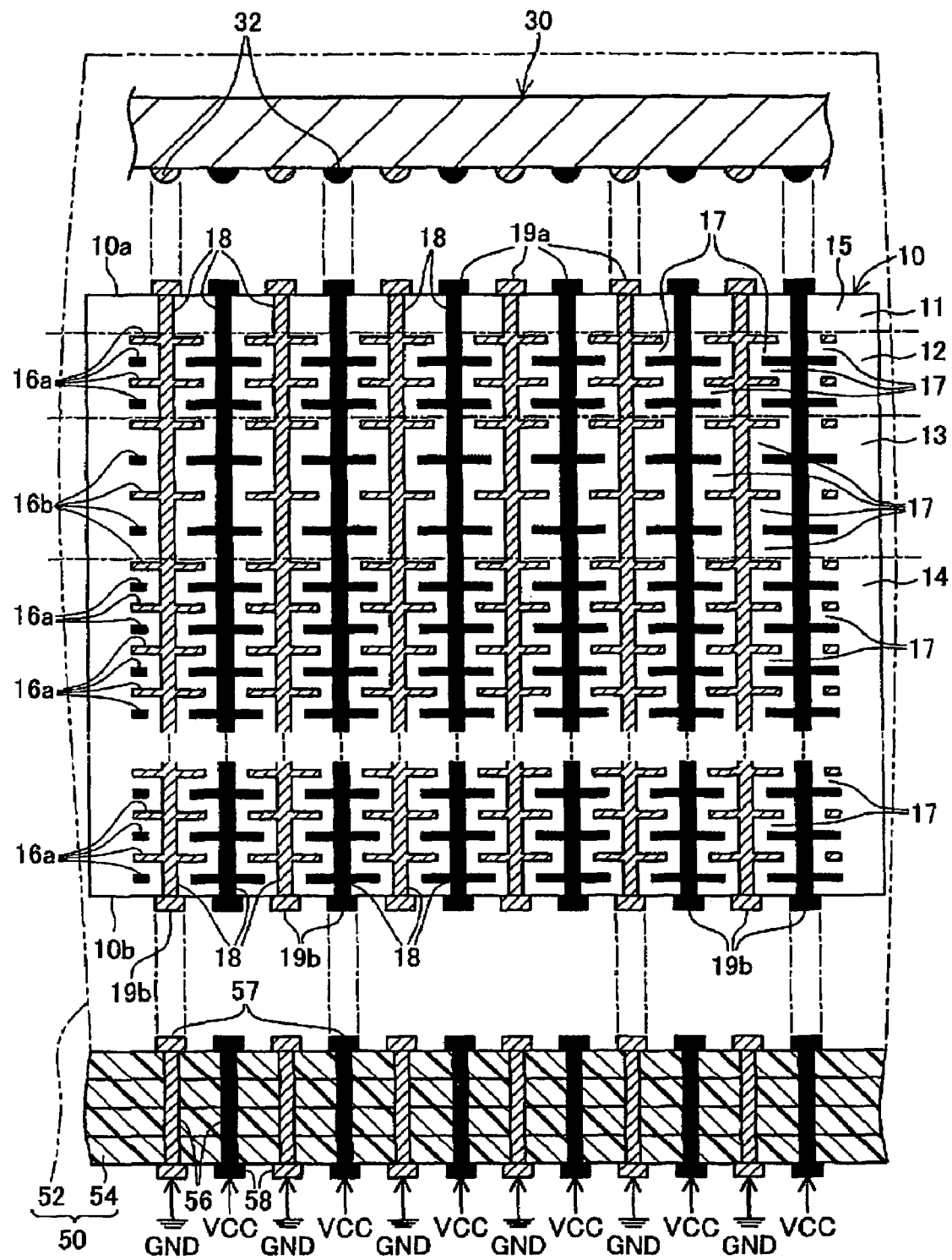
FIG. 1 is an explanatory, vertical sectional view showing an example disposition of a laminated ceramic capacitor 10 according to an embodiment of the present invention.

Reference numerals used to identify various structural elements in the drawings include the following.
10 . . . laminated ceramic capacitor
10a . . . front-side surface
10b . . . back-side surface
11 . . . first laminate (first dielectric portion)
12 . . . second laminate (partial laminate)
12A . . . second laminate
13, 13N . . . third laminate (second dielectric portion)
13A . . . third laminate
14 . . . fourth laminate (residual laminate)
15 . . . ceramic layer
16a . . . internal electrode
16b . . . internal electrode
17 . . . ceramic layer
18 . . . via electrode
19a . . . front-side terminal
19b . . . back-side terminal
20a . . . aperture portion
20b . . . aperture portion
22A . . . ceramic green sheet
22B . . . ceramic green sheet
24 (24a, 24b) . . . internal electrode layer
25 (25a, 25b) . . . aperture portion
25A . . . aperture-portion vertical-alignment region
25B . . . periphery-of-aperture-portion region
26 . . . through hole
27 . . . release sheet
28 . . . cover layer
29 . . . cover sheet
32 . . . pad
50 . . . package
52 . . . upper layer
54 . . . lower layer
56 . . . lead
57 . . . bump
58 . . . terminal
60 . . . wiring board
66 . . . lead
67 . . . terminal
100 . . . sheet laminate
150 . . . laser beam

DETAILED DESCRIPTION OF THE PREFERRED EMBODIMENTS

The present invention will next be described in greater detail with reference to the drawings. However, the present invention should not be construed as being limited thereto.

A-1. Configuration of Laminated Ceramic Capacitor 10:

FIG. 1 is an explanatory, vertical sectional view showing an exemplary arrangement of a laminated ceramic capacitor 10 according to an embodiment of the present invention. As shown in FIG. 1, an IC chip 30 and a package 50 are connected together via the laminated ceramic capacitor 10.

The IC chip 30 is a high precision component in which a large number of circuit elements, such as transistors and resistors, are formed on a single silicon substrate (wafer). The circuit elements thus formed are connected by means of a large number of aluminum lines. The aluminum lines connected to the circuit elements are led to the lower surface of the IC chip 30 and connected to corresponding bump-like pads 32. The pads 32 are formed in large number on the lower surface of the IC chip 30 in a lattice array corresponding to positions where the aluminum lines are led out.

The package 50 is a container for containing the IC chip 30 while the laminated ceramic capacitor 10 intervenes therebetween. The package 50 has a lower layer 54, which serves as an insulating layer on which the laminated ceramic capacitor 10 is disposed. In the present embodiment, the lower layer 54 is formed from epoxy resin. The lower layer 54 can also be formed from another insulating material (e.g., a resin material other than epoxy resin, or ceramic). In addition to the lower layer 54, an upper layer 52 (represented by the framing two-dot-and-dash line in FIG. 1) may be employed as an insulating layer for covering the IC chip 30, together with the laminated ceramic capacitor 10, on the lower layer 54. By sealing in the insulating layer, the IC chip 30 can be effectively protected from externally caused damage.

The lower layer 54 is formed by laminating a large number of rectangular plate elements made of epoxy resin. Leads 56 formed from a copper plating layer or copper foil establish electrical connection between the layers of the lower layer 54. The leads 56 include bumps 57 exposed on the upper surface (the surface facing upward in FIG. 1) of the lower layer 54, and terminals 58 exposed on the lower surface (the surface facing downward in FIG. 1) of the lower layer 54. The bumps 57 are terminals to be connected to the laminated ceramic capacitor 10, which will be described below, and are formed in a large number on the upper surface of the lower layer 54 in a lattice array. Conductor lines including power lines and ground lines are soldered to the corresponding terminals 58. In FIG. 1, the leads 56 used as power lines, and the bumps 57 and terminals 58 associated with the power lines are represented in solid black, whereas the leads 56 used as ground lines are represented by hatching. Leads used as signal lines are not shown.

For the sake of convenience, the laminated ceramic capacitor 10 can be divided into four sections as divided by the two-dot-and-dash lines shown in FIG. 1. The four sections are, from the side of the IC chip 30, a first laminate 11, a second laminate 12, a third laminate 13, and a fourth laminate 14. In the laminated ceramic capacitor 10 serving as a completed product, these laminates are united as a result of having undergone firing. The illustrated two-dot-and-dash lines are used for dividing the laminated ceramic capacitor 10 into the above-mentioned first to fourth laminates for the sake of convenience.

The first laminate 11 includes a single or a plurality of ceramic layers 15, and the ceramic layer 15 serves as a dielectric layer. Thus, the first laminate 11 includes a dielectric layer and serves as the first dielectric portion in the present invention. The first laminate 11 is formed such that the ceramic layer 15 is thicker than a single ceramic layer 17 (interelectrode dielectric layer) intervening between internal electrodes 16a in the second laminate 12 or the fourth laminate 14, which will be described below, and thinner than 20 times the thickness of the single ceramic layer 17.

The second laminate 12 and the fourth laminate 14 differ in location in the laminated ceramic capacitor 10, but assume a structure (hereinafter referred to as a "multilayer structure") in which a large number of ceramic layers 17 and internal electrodes 16a are arranged alternatingly in layers such that the ceramic layer 17 is sandwiched between opposed internal electrodes 16a; i.e., the second and fourth laminates 12 and 14 assume a multilayer structure in which a large number of ceramic layers 17 and internal electrodes 16a are arranged alternatingly in layers such that the ceramic layer 17 is sandwiched between the opposed internal electrodes 16a. Accordingly, the second laminate 12 and the fourth laminate 14 constitute the electrode laminate portion in the present invention in which a plurality of internal electrodes are arranged in layers with a dielectric layer sandwiched between opposed internal electrodes. The opposed internal electrodes 16a serve as a first electrode layer and a second electrode layer in the present invention. The second laminate 12 serves at least as a part or rather partial range of the electrode laminate portion in the present invention, the partial range including internal electrodes (internal electrodes 16a) and dielectric layers (ceramic layers 17) of the electrode laminate portion; and the second laminate 12 serves as the partial laminate in the present invention, the partial laminate being a portion of the electrode laminate portion. The fourth laminate 14 serves as the residual laminate in the present invention, the residual laminate being the residual portion of the electrode laminate portion after removing the partial range or the partial laminate.

In the second laminate 12 and the fourth laminate 14, the internal electrodes 16a are formed such that a first electrode layer colored in black alternates with a second electrode layer that is hatched, in a predetermined repetitive pattern and in a mutually opposed condition. The internal electrodes 16a are electrically connected to via electrodes 18 such that the first electrode layers are electrically connected to their common via electrodes 18, while the second electrode layers are electrically connected to their common via electrodes 18. The via electrodes 18 are connected to the IC chip 30, to the package 50 (specifically the lower layer 54), to an external power supply, to an external circuit, or to a like component, via front-side terminals 19a and back-side terminals 19b.

In the third laminate 13 sandwiched between the second laminate 12 and the fourth laminate 14, as in the case of the second and fourth laminates 12 and 14, internal electrodes 16b are formed such that a first electrode layer colored in black alternates with a second electrode layer that is hatched, in a predetermined repetitive pattern (second repetitive pattern) and in a mutually opposed condition. The internal electrodes 16b are electrically connected to the via electrodes 18 such that the first electrode layers are electrically connected to their common via electrodes 18, while the second electrode layers are electrically connected to their common via electrodes 18.

The third laminate 13 includes dielectric layers, which serve as the ceramic layers 17, and has a thickness of 5% of the total thickness of the second laminate 12 and the fourth laminate 14. Accordingly, the third laminate 13 serves as the second dielectric portion in the present invention. The opposed internal electrodes 16b in the third laminate 13 serve as the third electrode layers and the fourth electrode layers in the present invention.

The via electrodes 18 extending through the first laminate 11 to the fourth laminate 14 are formed in the laminating direction of the internal electrodes 16a and 16b and extend from the first laminate 11 so as to be electrically connected to the internal electrodes (the first electrode layers and the second electrode layers) in the second, third, and fourth laminates 12, 13, and 14.

As shown in, FIG. 1; the second laminate 12 and the fourth laminate 14 differ from the third laminate 13 in the thickness of the ceramic layer 17 intervening between electrode layers. The ceramic layer 17 of the third laminate 13 has a thickness of about two to 20 times that (about 5 µm) of the ceramic layer 17 of the second and fourth laminates 12 and 14; specifically, 10 µm to 100 µm. The third laminate 13 has a smaller number of electrode layers than the fourth laminate 14 and has a thickness of about 5% to 30% the overall thickness of the laminated ceramic capacitor 10. For example, in the present embodiment, the laminated ceramic capacitor 10 has a thickness of 1 mm, and the third laminate 13 has a thickness of about 100 µm. The third laminate 13 assumes the form of a four-layer laminate; i.e., the ceramic layers 17 each having a thickness of 25 µm are laminated such that the internal electrodes 16b are arranged in three layers while each being sandwiched between the ceramic layers 17. In this case, the second laminate 12 may be configured such that the internal electrodes 16a are arranged in several layers; in the present embodiment, in about four layers. Even when the laminated ceramic capacitor 10 is made thinner, the total thickness of the second laminate 12 and the fourth laminate 14 is preferably 400 µm or greater, for securing high capacitance.

The internal electrodes 16a and 16b and the via electrodes 18 will next be described. The internal electrode 16a and the internal electrode 16b may assume the same pattern or different patterns. Since the via electrodes 18 are formed while being arranged at equal pitch spacings, the following description assumes that the internal electrodes 16a and 16b assume the same pattern, and the second laminate 12 is described by way of example. FIG. 2 is an explanatory view showing the internal electrode 16a and the arrangement of the via electrodes 18 in the second laminate 12.

Figure 2A:
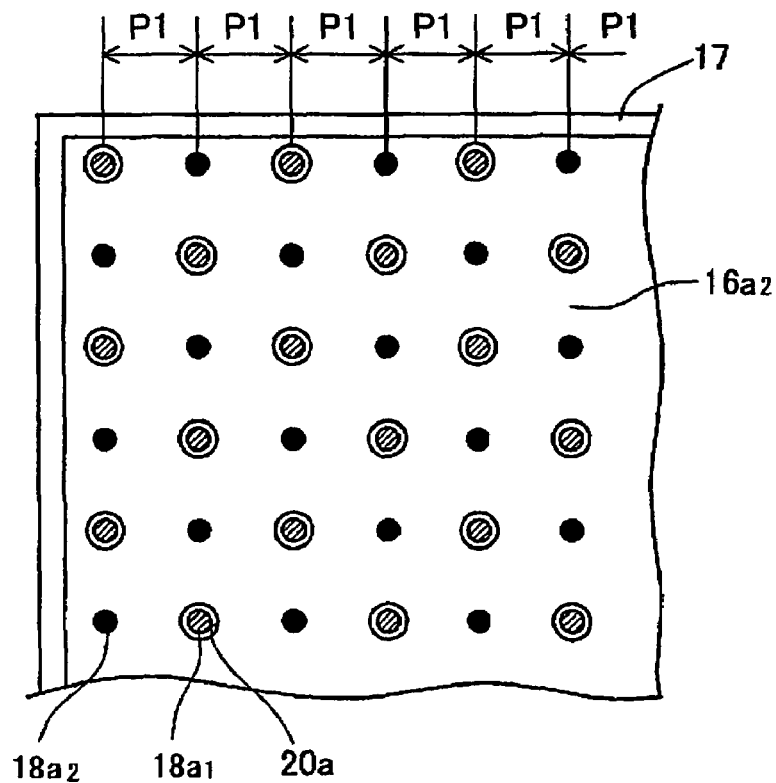
FIGS. 2(A) and 2(B) are explanatory views showing an internal electrode 16a and the arrangement of via electrodes 18 in the second laminate

As shown in FIG. 2(A), the illustrated internal electrode 16a is connected to those via electrodes 18 that are colored in black and extend therethrough. The internal electrode 16a is electrically insulated from those via electrodes 18 that are hatched, by means of aperture portions 20a which are formed therein and through which the corresponding via electrodes 18 that are hatched extend. The via electrodes 18 colored in black and the via electrodes 18 that are hatched are formed at a predetermined repetitive pitch P1 and in a repeated manner.

Figure 2B:
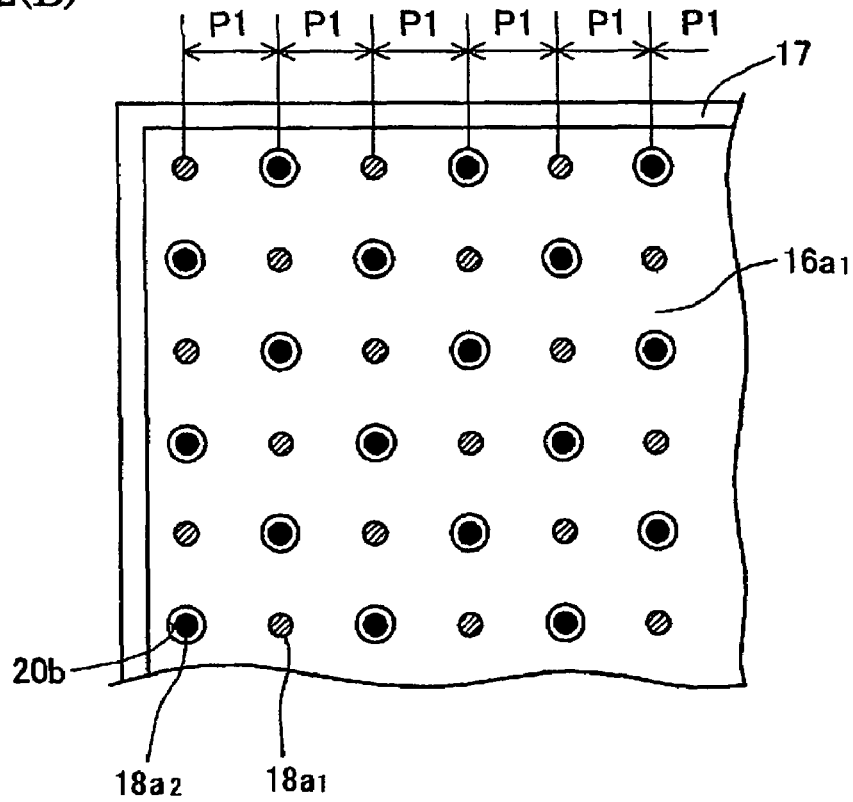

As shown in FIG. 2(B), the illustrated internal electrode 16a is connected to those via electrodes 18 that are hatched and extend therethrough. The internal electrode 16a is electrically insulated from those via electrodes 18 that are colored in black, by means of aperture portions 20b which are formed therein and through which the corresponding via electrodes 18 colored in black extend.

Since the illustrated internal electrodes 16a are arranged in layers, in the region of the aperture portions 20a and 20b, the internal electrodes are absent. Accordingly, the internal electrodes 16a are arranged in layers while being opposed to each other in a region that remains after removal of the aperture portions 20a and 20b.

The fourth laminate 44 is identical in structure with the above-described second laminate 12. When the third laminate 13 is identical in pattern with the second and fourth laminates 12 and 14, the third laminate 13 assumes a structure similar to those of the second and fourth laminates 12 and 14. The third laminate 13 differs from the second and fourth laminates 12 and 14 only in the thickness of the ceramic layer 17 sandwiched between the internal electrodes 16b, but is identical with the second and fourth laminates 12 and 14 in terms of, for example, internal-electrode pattern and via electrode pitch. As an example in which the third laminate 13 differs in pattern from the second and fourth laminates 12 and 14, the aperture portions 20a and 20b shown in FIG. 2 are increased in size for the laminate 13. Use of aperture portions of an increased size is effective for avoiding contact between the internal electrode and the via electrodes.

As described above, in the laminated ceramic capacitor 10, the second, third, and fourth laminates 12, 13, and 14 are configured such that the internal electrodes 16a or 16b are provided in opposition to each other in the dielectric composed of the ceramic layers 17. Such opposed electrodes function as a capacitor. Specifically, connection of the internal electrodes 16a to (first) via electrodes 18 and connection of internal electrodes 16b to (second) via electrodes 18 carry out the function of a multilayer capacitor in which the first electrode layers and the second electrode layers are provided in opposition to each other. The laminated ceramic capacitor 10 having such a multilayer structure can provide high capacitance in a small size.

Figure 3:
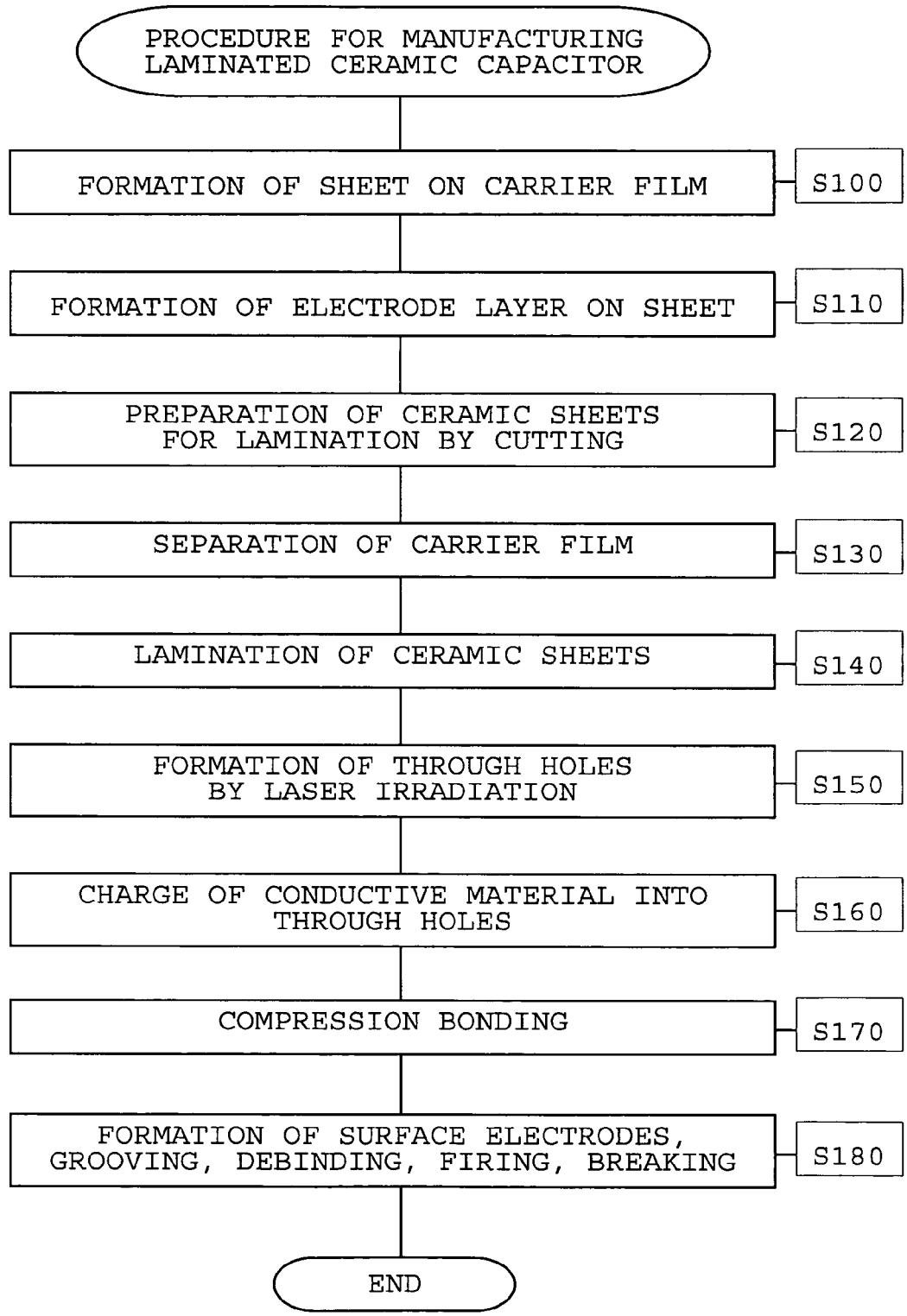
FIG. 3 is a flowchart showing a procedure for manufacturing the laminated ceramic capacitor 10.

A.2. Method for Manufacturing Laminated Ceramic Capacitor 10:

The laminated ceramic capacitor 10 thus configured can be manufactured by the method described below. FIG. 3 is a flowchart showing a procedure for manufacturing the laminated ceramic capacitor 10; FIG. 4 is an explanatory view illustrating the procedure of FIG. 3 with respect to the second laminate 12 and the fourth laminate 14; and FIG. 5 is an explanatory view illustrating the procedure of FIG. 3 with respect to the third laminate 13. The laminated ceramic capacitor 10 is manufactured through the steps S100 to S180 of FIG. 3. The steps will next be described in detail and in order beginning with step S100.

(2)-1 Formation of Sheet on Carrier Film (Step S100)

First, a ceramic slurry made of barium titanate ($BaTiO_3$) or the like is applied thinly and evenly to an elongated carrier film, such as a PET (polyethylene terephthalate) film, and then the applied slurry is allowed to dry. Thus, a ceramic green sheet 22A is formed on the carrier film. The ceramic green sheet 22A, after firing, becomes a dielectric layer that serves as the ceramic layer 17 in the second and fourth laminates 12 and 14, and serves as the dielectric material in the present invention.

In manufacture of the third laminate 13, a ceramic green sheet 22B is formed on a carrier film on a production line different from that used for preparing the second and fourth laminates 12 and 14 while employing the same procedure. The ceramic green sheet 22B, after firing, becomes the ceramic layer 17 in the third laminate 13. As shown in FIGS. 4 and 5, there is a difference in thickness between the ceramic green sheet 22A for the second and fourth laminates 12 and 14 and the ceramic green sheet 22B for the third laminate 13. The ceramic green sheet 22B has a thickness of about five times that of the ceramic green sheet 22A. The ceramic green sheet 22B, after firing, becomes a dielectric layer that serves as the ceramic layer 17 in the third laminate 13, and serves as the dielectric material in the present invention. The thick ceramic green sheet 22B is prepared separately from the ceramic green sheet 22A. However, a laminated sheet formed by laminating a plurality of ceramic green sheets 22A on which an internal electrode is not formed may be used as the thick ceramic green sheet 22B.

(2)-2 Formation of Electrode Layer on Sheet (Step S110)

Next, an Ag—Pd electrode pattern is printed on the dried ceramic green sheets 22A and 22B by a screen printing process or the like. Thus, the internal electrode layer 24 (24a or 24b) is formed on the surfaces of the ceramic green sheets 22A and 22B in a region where the electrode pattern is printed (see FIGS. 4 and 5). Also, aperture portions 25 (25a or 25b) where the electrode pattern is not printed are present on the surfaces of the ceramic green sheets 22A and 22B. In the present embodiment, the internal electrode layer 24 has a thickness of 2 μm to 3 μm; the ceramic green sheet 22A has a thickness of 6 μm; and the ceramic green sheet 22B has a thickness of 30 μm.

The thus-formed internal electrode layers 24 (24a and 24b), after firing, become the internal electrodes 16a and 16b in the second to fourth laminates 12 to 14. Thus, the printed electrode pattern (Ag—Pd electrode pattern) serves as the internal-electrode formation material in the present invention. The same electrode pattern 24a (24b) is formed on the surfaces of the ceramic green sheets 22A and 22B. However, an electrode pattern formed on the ceramic green sheet 22A and an electrode pattern formed on the ceramic green sheet 22B may differ from each other, for example, by employing different sizes for the aperture portions as mentioned previously.

(2)-3 Preparation of Ceramic Sheets for Lamination by Cutting and Separation of Carrier Film (Steps S120 and S130)

Next, while the elongated carrier film on which the ceramic green sheet 22A (22B) is formed is being transported, the ceramic green sheet 22A (22B) on which the internal electrode layer 24 is formed is cut into a predetermined shape. The thus-cut ceramic green sheets 22A and 22B are separated from the corresponding carrier films, for example, by taking up the carrier films. As shown in FIGS. 4(A) and 4(B) and FIGS. 5(A) and 5(B), two kinds of ceramic green sheets 22A that differ with respect to the internal electrode layer 24 and the layout of the aperture portions 25, and two kinds of ceramic green sheets 22B that differ with respect to the internal electrode layer 24 and the layout of the aperture portions 25 are prepared by cutting. FIGS. 4(A) and 5(A) correspond to a sectional view of FIG. 2(A); and FIGS. 4(B) and 5(B) correspond to a sectional view of FIG. 2(B).

(2)-4 Lamination of Ceramic Sheets (Step S140)

Figure 6:
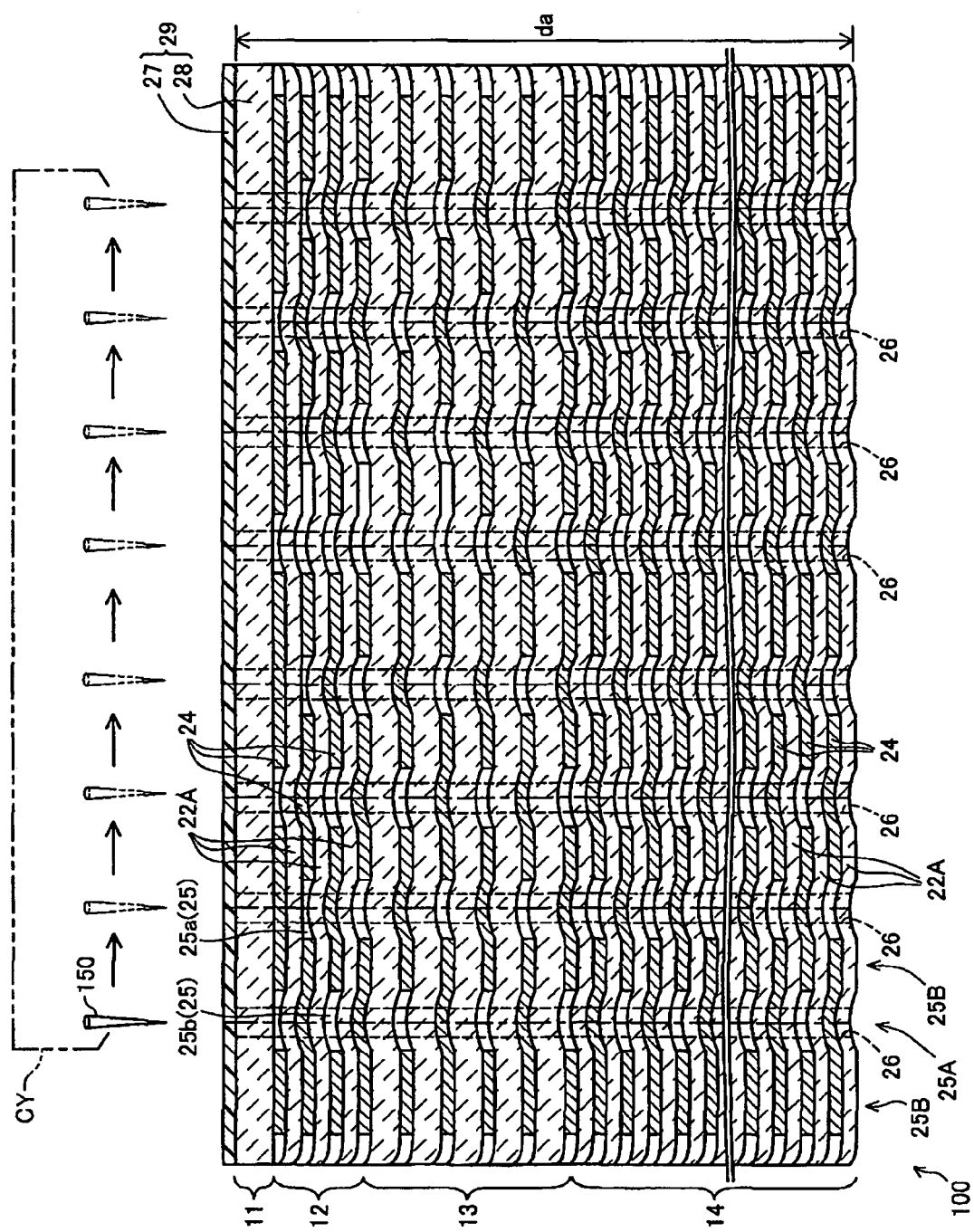
FIG. 6 is an explanatory view schematically showing a state upon completion of lamination of sheets, and laser irradiation.

FIG. 6 is an explanatory view schematically showing a state upon completion of lamination of sheets, and laser irradiation at a later step, which will be described below. A plurality of ceramic green sheets 22A and 22B are laminated as described below.

First, a cover sheet 29 is laid. As shown in FIG. 6, the cover sheet 29 includes a release sheet 27 made of PET (polyethylene terephthalate) and a cover layer 28. The cover layer 28 is formed by applying a thick ceramic slurry to the release sheet 27 and allowing the applied slurry to dry. The cover layer 28 has substantially the same thickness as that of the ceramic green sheet 22B and becomes, after firing, the ceramic layer 15 in the first laminate 11.

Subsequently, a plurality of the two kinds of ceramic green sheets 22A of two kinds shown in FIGS. 4(A) and 4(B) are arranged alternatingly in layers. The number of layers depends on the thickness of the second laminate 12, and is four in the present embodiment. In laminating the sheets, as shown in FIG. 6, the illustrated uppermost ceramic green sheet 22A is overlaid on the cover layer 28 so that its internal electrode layer 24 comes into contact with the cover layer 28. Subsequently, the next ceramic green sheet 22A is overlaid on the last laminated ceramic green sheet 22A so that its internal electrode layer 24 comes into contact with the last laminated ceramic green sheet 22A. The thus-laminated ceramic green sheets 22A constitute the second laminate 12.

Subsequent to laminating a predetermined number of ceramic sheets 22A, a predetermined number (four in FIG. 1) of ceramic green sheets 22B are laminated on the last laminated ceramic green sheet 22A. In laminating the ceramic green sheet 22B on the last laminated ceramic green sheet 22A, the ceramic green sheet 22B is overlaid on the ceramic green sheet 22A so that its internal electrode layer 24 comes into contact with the ceramic green sheet 22A. Subsequently, the remaining ceramic green sheets 22B are similarly laminated. The thus-laminated ceramic green sheets 22B constitute the third laminate 13.

Next, the ceramic green sheet 22A is again laminated on the last laminated ceramic green sheet 22B. Also, in this lamination, the ceramic green sheet 22A is overlaid on the last laminated ceramic green sheet 22B so that its internal electrode layer 24 comes into contact with the last laminated ceramic green sheet 22A. Subsequently, the remaining ceramic green sheets 22A are similarly laminated. In this case, the number of ceramic green sheets 22A to be laminated depends on the capacitance that the completed laminated ceramic capacitor 10 must have. In the present embodiment, the number of ceramic green sheets 22A is 150 and corresponds to a thickness of about 850 mm as measured after firing. The thus-laminated ceramic green sheets 22A constitute the fourth laminate 14. As a result of the above lamination of sheets, a ceramic sheet laminate 100 is obtained.

In order to form the sheet laminate 100 in which the first to fourth laminates 11 to 14 are laminated together, as described above, first, the ceramic green sheets 22A are laminated on the first laminate 11 to thereby form the second laminate 12; subsequently, the ceramic green sheets 22B are laminated on the second laminate 12 to thereby form the third laminate 13; and finally, the ceramic green sheets 22A are laminated on the third laminate 13 to thereby form the fourth laminate 14. In place of the above-described procedure, the following procedures may be employed. Each of the first to fourth laminates 11 to 14 is formed beforehand by laminating the relevant ceramic green sheets. Then, the laminates 11 to 14 are laminated together. Alternatively, the above-described procedure for forming the laminates may be reversed. Specifically, first, the ceramic green sheets 22A are laminated to thereby form the fourth laminate 14; subsequently, the ceramic green sheets 22B are laminated on the fourth laminate 14 to thereby form the third laminate 13; then, the ceramic green sheets 22A are laminated on the third laminate 13 to thereby form the second laminate 12; and finally, the first laminate 11 is overlaid on the second laminate 12.

The overall thickness da of the sheet laminate 100 including the cover sheet 29 determines the thickness of the completed laminated ceramic capacitor 10. The thickness d0 of the ceramic green sheet 22A (see FIGS. 4 and 5), the thickness d1 of the ceramic green sheet 22B (see FIGS. 4 and 5), the total number of laminated ceramic green sheets 22A and 22B, and the thickness of the cover layer 28 determine the thickness da and depend on the required specifications and size of the laminated ceramic capacitor 10. In the present embodiment, in order to obtain a capacitor thickness of 1 mm as measured after firing, the overall thickness da of the ceramic sheet laminate 100 is set to 1.2 mm.

In a state in which the above lamination has been completed, because the green sheets are not rigid, the laminated green sheets are deformed so that a green sheet sags to a certain extent into the aperture portions 25 (25a or 25b) of an underlying green sheet. End portions of the laminated ceramic green sheets 22A and 22B also sag. In this case, the degree of sag into the aperture portions is large with respect to the ceramic green sheet 22A. This is because the ceramic green sheet 22A is thin.

As shown in FIG. 6, in a region where the aperture portions 25 are vertically aligned (aperture-portion vertical-aligned region 25A), the internal electrode layer 24 is absent every other layer. In a region surrounding the aperture portions 25 (periphery-of-aperture-portion region 25B), the green sheets do not sag. This is because the internal electrode layers 24 are present in the vertical direction such that each green sheet intervenes between the opposed internal electrode layers 24. As a result, the periphery-of-aperture-portion region 25B slightly projects beyond the aperture-portion vertical-alignment region 25A.

(2)-5 Formation of Through Holes by Laser Irradiation (Step S150)

Next, through holes 26 in which a conductive material is to be charged are formed in the sheet laminate 100 by use of a laser. In the present embodiment, the conductive material (conductive paste) charged into the through holes 26 becomes the via electrodes 18 shown in FIG. 1 upon completion of the product.

As shown in FIG. 6, in the sheet laminate 100, the aperture portions 25 provided in the ceramic green sheets 22A and 22B are aligned every other layer in the laminating direction of the sheets; i.e., vertically. The laser emits a laser beam 150 along the axis (dot-and-dash line in FIG. 6) that passes through the centers of the aperture portions 25 aligned vertically. Heat generated by laser irradiation melts the ceramic green sheets 22A and 22B, the internal electrode layers 24, and the cover sheet 29 at portions located along the axis to thereby form the through hole 26 that extends through the laminate vertically along the axis.

Figure 7:
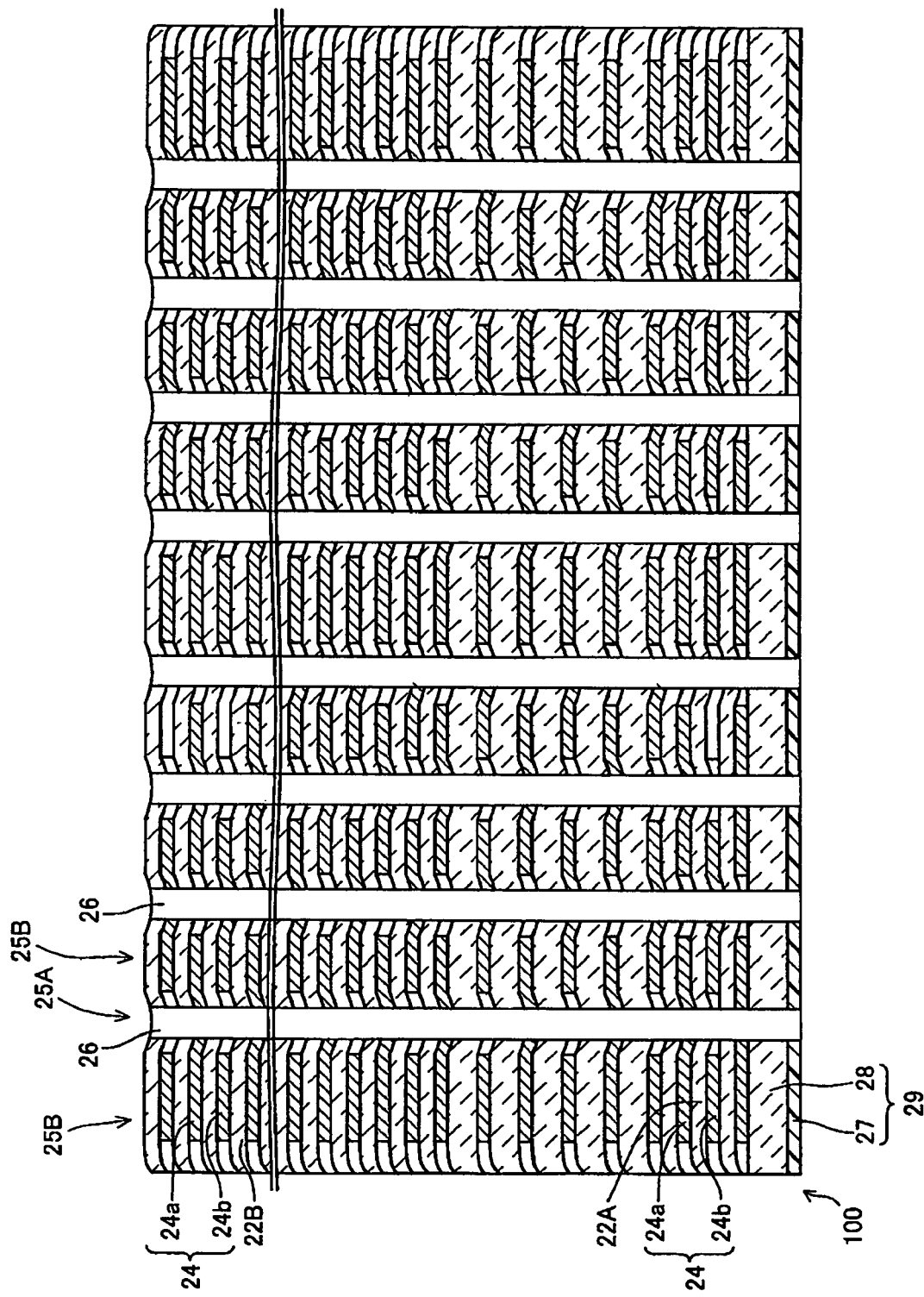
FIG. 7 is an explanatory view schematically showing through holes 26, in the case that the through holes 26 are formed straight.

FIG. 7 is an explanatory view schematically showing the through holes 26, in the case where the through holes 26 are formed straight. As shown in FIG. 7, the through hole 26 is smaller in diameter than the aperture portion 25 in order to insulate the via electrode 18 formed in the through hole 26 from the internal electrode layers 24 in which the corresponding aperture portions 25 are formed. In the present embodiment, the diameter of the through hole 26 is set to 120 μm so as to become 100 μm after firing; and the diameter of the aperture portion 25 is set to 350 μm. No particular limitation is imposed on these diameters. The through hole 26 may have a diameter of 60 μm to 150 μm. The through-hole diameter may be determined in consideration of, for example, viscosity of a conductive material (filler material), which will be described below, to be charged into the through holes 26. The diameter of the aperture portion 25 may be determined in consideration of a pitch at which the aperture portions 25 are arranged.

Since the sheet laminate 100 shown in FIG. 6 has a rectangular shape as viewed from above, the aperture portions 25 are arranged in matrix form. Accordingly, the sheet laminate 100 is irradiated from above with the laser 150 not only at the eight positions shown in FIG. 7, but also at other positions corresponding to the aperture portions 25 arranged in a matrix. Therefore, a large number of through holes 26 are formed in the sheet laminate 100 in matrix form.

In order to form the through holes 26 in the sheet laminate 100 at a plurality of different positions, the present embodiment employs a so-called cyclic machining process. As shown in FIG. 6, according to the cyclic machining process, a process CY for applying the laser beam 150 sequentially to through-hole formation positions is repeated several times so as to gradually increase the depth of holes at the through-hole formation positions until all of the through holes are completed at the corresponding through-hole formation positions.

A shown in FIG. 6, in the present embodiment, the cover sheet 29 is located on the side that is irradiated with the laser beam 150. Accordingly, melt (e.g., a melt of an organic component contained in the electrode or green sheet) generated by irradiation with the laser beam 150 does not adhere to the surface of the ceramic green sheet 22A.

In performing the above-described steps up to step S150, the order of the steps can be changed. For example, the step S130 of separating the carrier film and the step S140 of laminating the sheets may be reversed. Also, the step S120 of preparing the sheets by cutting may precede the step S110 of forming an electrode layer. Furthermore, the steps may be performed in the order S120, S110, S140 and S130.

(2)-6 Charge of Conductive Material into Through Holes (Step S160)

Next, a conductive material is charged into the through holes 26 of the sheet laminate 100. Specifically, the sheet laminate 100 is set in an unillustrated charger, and then a conductive material is injected into the through holes 26 under pressure. The pressure-injected conductive material fills the through holes 26 to thereby reach the wall surfaces of the internal electrode layers 24, and is solidified. The thus-solidified conductive material functions as the aforementioned via electrodes 18 (see FIG. 1).

(2)-7 Compression Bonding (Step S170)

Next, the sheet laminate 100 charged with the conductive material undergoes compression bonding. Specifically, the sheet laminate 100 is set in an unillustrated pressure vessel and is then subjected to pressing at high temperature and high pressure. As a result, a large force is applied to the periphery-of-aperture-portion region 25B of the surface of the sheet laminate 100 which projects externally and under which the internal electrode layers 24 are present, whereby the ceramic green sheets 22A and 22B are firmly compression-bonded.

(2)-8 Formation of Surface Electrodes, Grooving, Debindering, Firing, and Breaking (Step S180)

Next, the sheet laminate 100 is removed from the pressure vessel. Surface electrodes (front-side terminals 19a and back-side terminals 19b) are formed on the sheet laminate 100 by screen printing or the like. The surface terminals 19a and 19b are arranged at a pitch substantially equal to the via electrode pitch. The terminals 19a and 19b are formed in regions (regions corresponding to upper and lower ends of the via electrodes 18) on the upper and lower surfaces (front and back surfaces of the capacitor) of the bonded laminate where the conductive paste is exposed. The size of the terminals 19a and 19b and a terminal pitch are determined in consideration of the shrinkage of the conductive paste in the course of firing, which will be described below. In this case, the back-side terminals 19b are arranged at a pitch compatible with the terminal pitch (specifically, the pitch of arrangement of the bumps 57) of the package 50 to be connected to the capacitor. In the present embodiment, the back-side terminals 19b are arranged at a pitch identical with the pitch of arrangement of the front-side terminals 19a. However, the back-side terminals 19b may differ in pitch arrangement from the front-side terminals 19a depending on the arrangement of terminals of a package to be connected to the capacitor.

Subsequently, grooving is performed on the sheet laminate 100 in accordance with the size of the laminated ceramic capacitor 10 to be used. The grooved laminate is debindered and then fired. As a result of firing, the laminated ceramic capacitor 10 as shown in FIG. 1 is obtained. Breaking the fired sheet laminate 100 along the previously formed grooves (not shown) yields laminated ceramic capacitors 10 of smaller size.

A-3. Action and Effect:

As described above, in the laminated ceramic capacitor 10 of the present embodiment, as shown in FIG. 1, the internal electrodes 16a or 16b are arranged in layers with the ceramic layer 17 sandwiched between opposed internal electrodes 16a or 16b, and the via electrodes 18 electrically interconnect the internal electrodes 16a or 16b. This structure is employed even in the third laminate 13, which includes ceramic layers 17 thicker than those in the second and fourth laminates 12 and 14, as well as in the fourth laminate 14, which accounts for most of the laminated ceramic capacitor 10. Moreover, the laminated ceramic capacitor 10 is configured as follows: in the third laminate 13, the internal electrode 16b is provided for every thick ceramic layer 17, and the internal electrodes 16b are electrically connected to the via electrodes 18.

Accordingly, the function of absorbing an electrode-induced thickness differential that the base layer of the conventional capacitor performs is obtained by means of increasing the thickness of the ceramic layers 17 in the third laminate 13. Also, by means of regulating the thickness of the first laminate 11 located on the front side of the ceramic capacitor, portions of the via electrodes 18 that extend without being electrically connected to the internal electrodes 16a can be shortened. Therefore, the laminated ceramic capacitor 10 of the present embodiment can achieve low inductance while an electrode-induced thickness differential arising as a result of lamination of internal electrodes is absorbed.

In the laminated ceramic capacitor 10, while such a capacitor function is implemented, the via electrodes 18 extend from a front-side surface 10a to a back-side surface 10b. The via electrodes 18 extending through the laminated ceramic capacitor 10 between the front side and the back side can function as leads. Conventionally, via electrodes are used merely for supplying electricity to internal electrodes. By contrast, the laminated ceramic capacitor 10 allows the via electrodes 18 to be additionally used as leads extending therethrough between the front side and the back side. Thus, as shown in FIG. 1, the laminated ceramic capacitor 10 allows connection of an electronic device (IC chip 30 or package 50) to its opposite sides, thereby diversifying the form of mounting. In this case, the pitch of the front-side terminals 19a (the pitch of the via electrodes 18) on the front-side surface 10a can be rendered identical with the terminal pitch of the IC chip 30; and the pitch of the back-side terminals 19b on the back-side surface 10b can be rendered identical with the bump pitch of the package 50. Thus, the degree of freedom can be increased with respect to device mounting on the front side and the back side of the capacitor.

The front-side terminals 19a are formed on the front side of the capacitor in association with the via electrodes 18, and the back-side terminals 19b are formed on the back side of the capacitor in association with the via electrodes 18. This facilitates the connection of leads to the corresponding via electrodes and the connection of the capacitor to a component to be mounted, by way of the terminals. Specifically, the pads 32 of the IC chip 30 can be readily and reliably connected to the front-side terminals 19a of the laminated ceramic capacitor 10. The same holds true with respect to the bumps 57 of the package 50.

B. Modified Embodiment 1

Figure 8:
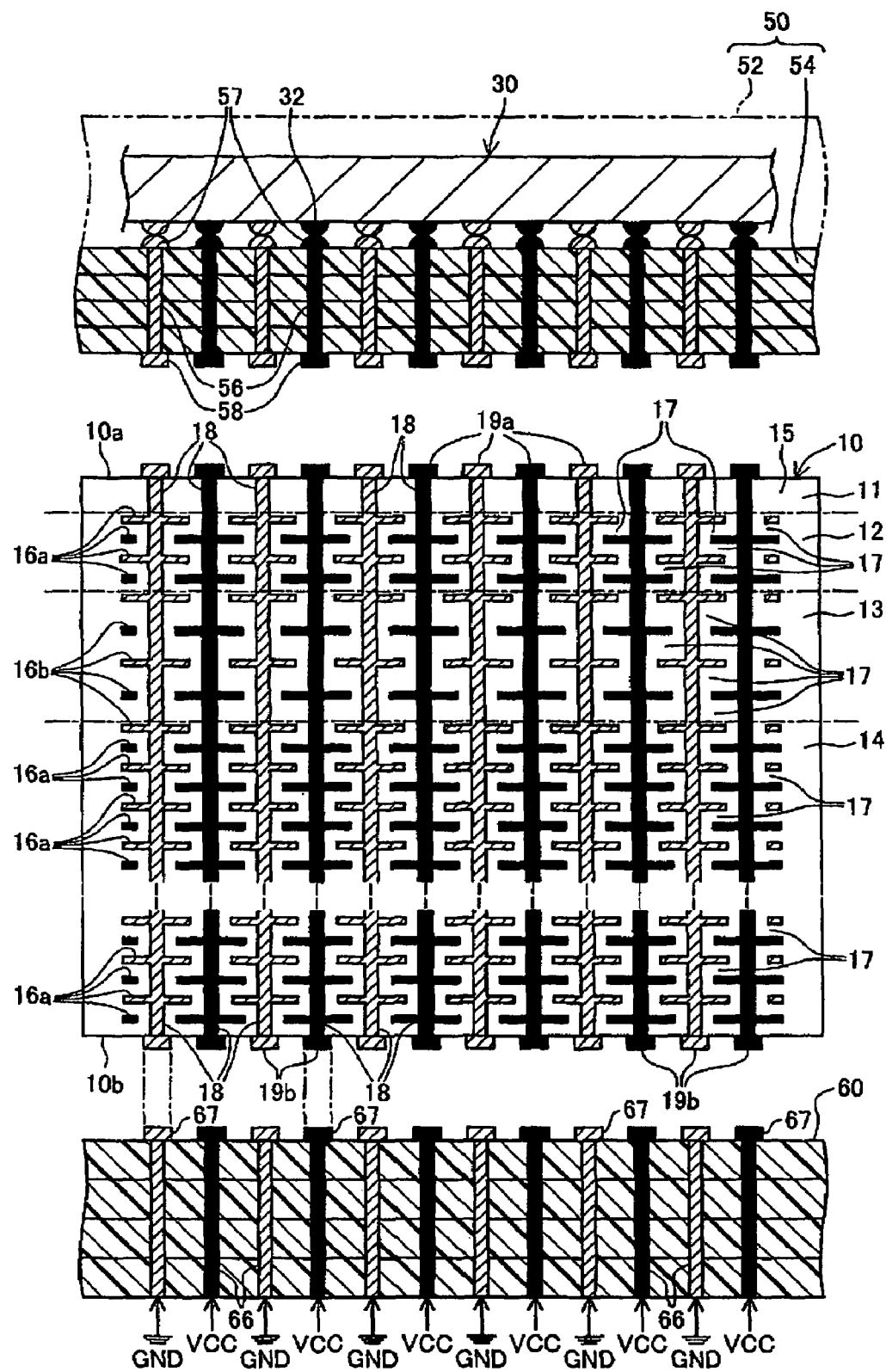
FIG. 8 is an explanatory view showing a modified embodiment of the laminated ceramic capacitor 10.

In the above-described embodiment, the laminated ceramic capacitor 10 intervenes between the package 50 and the IC chip 30. However, the laminated ceramic capacitor 10 may intervene between other electronic devices. FIG. 8 is an explanatory view showing a modified embodiment of the laminated ceramic capacitor 10.

In the modified embodiment shown in FIG. 8, the package 50 into which the IC chip 30 is fitted is connected to a wiring board 60, such as a motherboard, via the laminated ceramic capacitor 10. The IC chip 30 and the package 50 are identical with those associated with the above-described embodiment.

The wiring board 60 is a multilayer board made of epoxy resin and on which conductor lines and components are mounted for execution of control. Examples of the wiring board 60 include a printed wiring board, such as a motherboard. Leads 66 formed from a copper plating layer or copper foil establish electrical connection between the layers of the wiring board 60. The leads 66 include terminals 67 exposed on the upper surface (the surface facing upward in FIG. 8) of the wiring board 60. The terminals 67 are soldered to the corresponding back-side terminals 19b of the laminated ceramic capacitor 10. In FIG. 8, the leads 66 and the terminals 67 connected to the corresponding power lines are represented in solid black, whereas the leads 66 and the terminals 67 connected to the corresponding ground lines are represented by hatching. Leads used as signal lines are not shown.

The laminated ceramic capacitor of the above-described embodiment or modified embodiment may be connected beforehand to an IC chip, to a package, or to a wiring board. Examples of a laminated ceramic capacitor in such form include an IC-chip-connected capacitor in which an IC chip is connected to via electrodes of a laminated ceramic capacitor; a capacitor-connected package in which a package is connected to terminals of via electrodes of a laminated ceramic capacitor or to terminals of the capacitor; a capacitor-connected wiring board in which a wiring board is connected to terminals of via electrodes of a laminated ceramic capacitor; and a structure in which an IC chip and a package are connected via a laminated ceramic capacitor.

Figure 9:
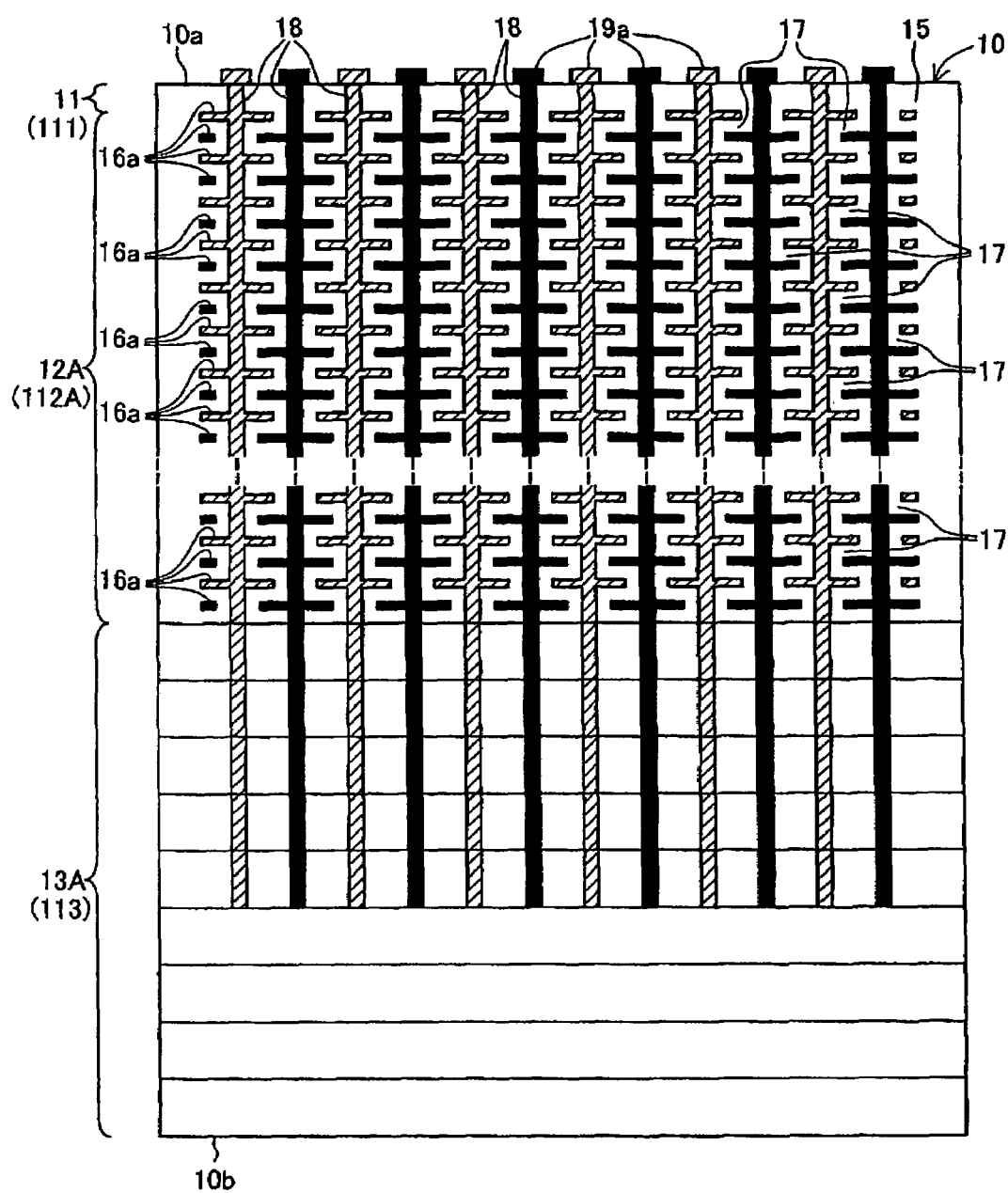
FIG. 9 is an explanatory view showing another modified embodiment of the laminated ceramic capacitor 10.

Furthermore, the laminated ceramic capacitor 10 can be modified as described below. FIG. 9 is an explanatory view showing another modified embodiment of the laminated ceramic capacitor 10.

As shown in FIG. 9, the laminated ceramic capacitor 10 of the present modified embodiment includes, from the side toward the front-side surface 10a, a first laminate 11, a second laminate 12A, and a third laminate 13A. In this case, the first laminate 11 is identical with that of the previously described embodiment. The second laminate 12A is a combination of the second laminate 12 and the fourth laminate 14 of the previously described embodiment. Accordingly, the second laminate 12A serves as the laminate in the present invention which in turn serves as the entire electrode laminate portion.

The third laminate 13A is a laminate of plain ceramic layers 17 each having no internal electrode 16b and is formed by laminating the ceramic green sheets 22B each having no internal electrode layer 24 on the lowermost ceramic green sheet 22A of the second laminate 12A. That is, the third laminate 13A serves as the second dielectric portion in the present invention that is overlaid on the laminate (second laminate 12A) that serves as the entire electrode laminate portion.

As shown in FIG. 9, in the laminated ceramic capacitor 10 of the present modified embodiment, holes are formed so as to extend to midway in the third laminate 13A, and a conductive material is charged into the holes to thereby form the via electrodes 18. Such a structure is formed as follows: the first laminate 11 and the second laminate 12A are laminated together in a manner similar to that of the previously described embodiment; and then the ceramic green sheets 22B are laminated on the second laminate 12A using as many pieces (five in FIG. 9) as necessary for partially constituting the third laminate 13A. Through holes are formed in the resultant laminate by means of the laser beam 150, and then the conductive material is charged into the holes. Subsequently, the remaining ceramic green sheets 22B are laminated on the laminate, followed by compression bonding and subsequent steps. In this manner, the laminated ceramic capacitor 10 of the present modified embodiment shown in FIG. 9 can be manufactured.

The present modified embodiment can also yield an effect similar to that of the laminated ceramic capacitor 10 that has been described with reference to FIG. 1. In the modified embodiment of FIG. 9, the via electrodes 18 can also be formed so as to extend through the laminated ceramic capacitor 10. In this case, through holes may be formed after all of the ceramic green sheets 22B are laminated, followed by charging with the conductive material.

The present invention is not limited to the above-described embodiment, but may be embodied in various other forms without departing from the spirit thereof. For example, since, as mentioned previously, no particular limitations are imposed on the third laminate 13 so long as the third laminate 13 performs the function of absorbing an electrode-caused thickness differential, the third laminate 13 shown in FIG. 1 may assume the form of a laminate composed of plain ceramic layers 17 each having no internal electrode 16b (refer to the section "Modified Embodiment 3"). In forming the third laminate 13, the ceramic green sheets 22B each having no internal electrode layer 24 are laminated on the laminate of the ceramic green sheets 22A. The laminated ceramic capacitor 10 may also assume a form where the back-side terminals 19b are omitted.

Next, a manufacturing method (a method of a modified embodiment) different from that of the previously described embodiment will be described. In the previously described embodiment, the second to fourth laminates 12 to 14 are sequentially laminated on the first laminate 11. In the present modified embodiment, the first to fourth laminates 11 to 14 are prepared beforehand, and then these laminates 11 to 14 are formed into the laminated ceramic capacitor 10. This feature of the present modified embodiment will be described below.

In the manufacturing method of the present modified embodiment, the first to fourth laminates 11 to 14, into which the laminated ceramic capacitor 10 is divided by the two-dot-and-dash line in FIG. 1, are manufactured separately. Each of the separately manufactured laminates undergoes the following steps.

As in the case of the previously described embodiment, the first laminate 11 is formed from the cover sheet 29. The second to fourth laminates 12 to 14 are subjected to the following processing steps.

In forming the second laminate 12, the steps S100 to S160, which have been described with reference to FIG. 3, are performed to thereby form the second laminate 12 in which the internal electrodes 16a are arranged in layers with the ceramic layer 17 sandwiched between opposed internal electrodes 16a. In this case, the second laminate 12 is already laminated on the first laminate 11. The resultant laminate is subjected to a step of forming through holes by laser irradiation and a step of charging a conductive material into the through holes. In parallel with forming the second laminate 12, the third and fourth laminates 13 and 14 are formed. Specifically, the steps S100 to S160, which have been described with reference to FIG. 3, are performed to thereby form the third laminate 13 in which the internal electrodes 16b are arranged in layers with the ceramic layer 17 sandwiched between opposed internal electrodes 16b as well as the fourth laminate 14 in which the internal electrodes 16a are arranged in layers with the ceramic layer 17 sandwiched between opposed internal electrodes 16a, followed by a step of forming through holes 26 and a step of charging a conductive material into the through holes 26. In this case, the through holes are formed, at the same pitch, in the second laminate 12, the third laminate 13, and the fourth laminate 14.

The thus-formed first to fourth laminates 11 to 14 are joined together. The laminates are joined in layers together in the following manner: the conductive paste in the filled holes extending through the second laminate 12, the conductive paste in the filled holes extending through the third laminate 13, and the conductive paste in the filled holes extending through the fourth laminate 14 are joined together in an aligned condition.

Next, the resultant laminate is subjected to a compression bonding step which has been described with reference to FIG. 3; i.e., the laminate is subjected to pressing at high temperature and high pressure. Subsequently, the steps of forming the front-side terminals 19a and the back-side terminals 19b on the front and back sides of the laminate, grooving, debindering, firing, and breaking are carried out. As a result, the laminated ceramic capacitor 10 as shown in FIG. 1 is completed.

The above manufacturing method is advantageous in that various types of third laminates 13, such as third laminates 13 including ceramic layer 17 of different thickness or third laminates 13 of different thicknesses, are prepared beforehand so as to cope with various applications of the laminated ceramic capacitor 10.

The manufacturing method of the above-described modified embodiment can be further modified as described below. In the above-described modified embodiment, the first to fourth laminates 11 to 14 are formed such that the through holes are charged with a conductive material. However, in the present embodiment, the first to fourth laminates 11 to 14 each assume the form of a laminate in which the through holes are not charged with a conductive material. The first to fourth laminates 11 to 14 are laminated together, and then the through holes are charged with a conductive material.

Also, the process of laminating the third laminate 13 on the second laminate 12 while the through holes are already charged with a conductive material can be modified as follows. Through holes are formed in each of the ceramic green sheets 22B shown in FIG. 5 and are then filled with a conductive material. The thus-prepared ceramic green sheets 22B whose through holes are already charged with the conductive material are sequentially laminated on the second laminate 12 whose through holes are already charged with the conductive material, thereby forming the third laminate 13. In this case, a similar process can be applied to forming of the fourth laminate 14. Specifically, through holes are formed in each of the ceramic green sheets 22A shown in FIG. 4 and are then filled with the conductive material. The thus-prepared ceramic green sheets 22A are laminated so as to form the fourth laminate 14. Alternatively, the fourth laminate 14 is formed first; through holes are formed in the ceramic green sheets 22A and 22B and are then charged with the conductive material; and then the thus-prepared ceramic green sheets 22A and 22B are sequentially laminated on the fourth laminate 14 so as to form the third laminate 13 and then the second laminate 12.

Figure 10:
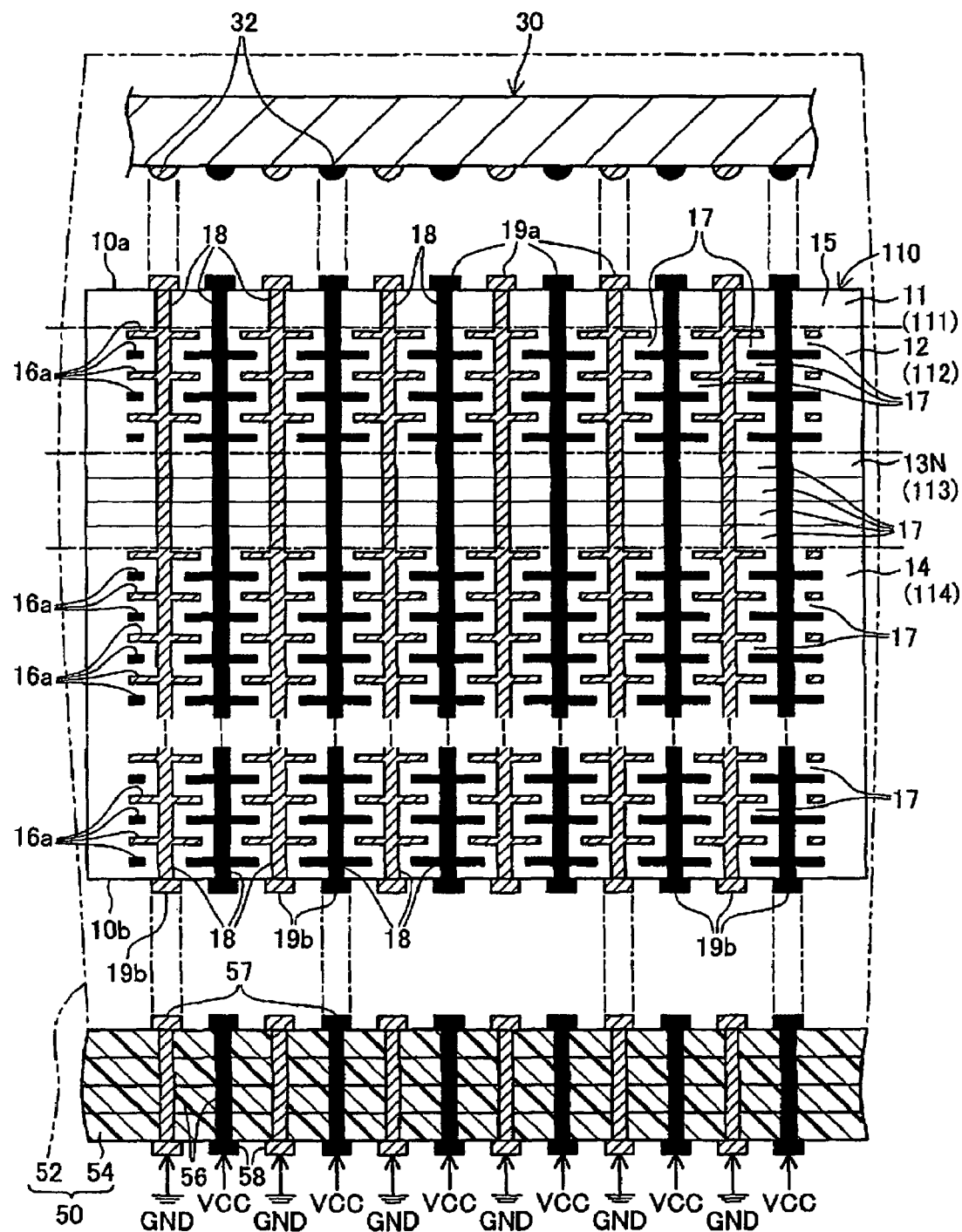
FIG. 10 is an explanatory view showing still another modified embodiment of the laminated ceramic capacitor.

The laminated ceramic capacitor can be further modified as described below. FIG. 10 is an explanatory view showing Modified Embodiment 3 of the laminated ceramic capacitor. In the modified embodiment of FIG. 10, the IC chip 30 and the package 50 are identical with those of the previously described embodiment.

As shown in FIG. 10, in the present modified embodiment, a laminated ceramic capacitor 110 includes, from the side toward its front-side surface 10a (from the capacitor front-surface side), a first laminate 11, a second laminate 12, a third laminate 13N, and a fourth laminate 14. In this case, the first laminate 11, the second laminate 12, and the fourth laminate 14 are identical with those of the previously described embodiment. The third laminate 13N does not include internal electrodes. Accordingly, the third laminate 13N serves as the second dielectric portion in the present invention. As in the case of the previously described embodiment, the first laminate 11 includes a dielectric layer and serves as the first dielectric portion in the present invention. The second laminate 12 serves as at least a part or partial range of the electrode laminate portion in the present invention, the partial range including internal electrodes (internal electrodes 16a) and dielectric layers (ceramic layers 17) of the electrode laminate portion; and the second laminate 12 serves as the partial laminate in the present invention, the partial laminate being a portion of the electrode laminate portion. The fourth laminate 14 serves as the residual laminate in the present invention, the residual laminate being the residual portion of the electrode laminate portion after removing the partial range or the partial laminate.

As shown in FIG. 10, the third laminate 13N is a laminate of plain ceramic layers 17 each having no internal electrode. The thickness of the first laminate 11 ranges from a thickness equal to that (about 5 mm) of the ceramic layer 17 of the second and fourth laminates 12 and 14, to a thickness about 20 times that (about 5 mm) of the ceramic layer 17; specifically, 5 mm to 100 mm. The third laminate 13N has a thickness of about 5% to 30% the overall thickness of the laminated ceramic capacitor 110. Even when the laminated ceramic capacitor 110 is made thinner, the thickness of the fourth laminate 14 is preferably 300 mm or greater for securing high capacitance. For example, in the present modified embodiment, the laminated ceramic capacitor 110 has a thickness of about 0.5 mm; the first laminate 11 has a thickness of 7 mm; the second laminate 12 has a thickness of about 35 mm; the third laminate 13N has a thickness of about 100 mm; and the fourth laminate 14 has a thickness of about 350 mm. The second laminate 12 includes six ceramic layers 17 each having a thickness of about 5 mm and six internal electrodes 16a each having a thickness of about 2 mm; the third laminate 13 includes four ceramic layers 17 each having a thickness of about 25 mm; and the fourth laminate 14 includes 50 ceramic layers 17 each having a thickness of about 5 mm and 50 internal electrodes 16a each having a thickness of about 2 mm.

In manufacturing the laminated ceramic capacitor 110 of the present modified embodiment, the step S140 of forming the third laminate 13 in the procedure of manufacturing the laminated ceramic capacitor 10 of the previously described embodiment is modified as follows: a predetermined number of ceramic green sheets 22B each having no internal electrode 24 are laminated together. The other steps are identical with those of the procedure of manufacturing the laminated ceramic capacitor 10.

Even the present modified embodiment can yield an effect similar to that of the laminated ceramic capacitor 10, described with reference to FIG. 1.

C. Comparison of Inductance between Examples (Examples of Modified Embodiment) and Comparative Examples The laminated ceramic capacitor of Modified Embodiment 3 (FIG. 10) had outside dimensions of 5.2 mm×5.2 mm as measured perpendicularly to the direction of lamination. The internal electrodes 16a had outside dimensions of 4.6 mm×4.6 mm. A total of 196 (14 in row×14 in column) via electrodes were formed. The via electrodes 18 were formed in such that the first via electrodes and the second via electrodes were arranged alternatingly at an equal pitch (330 µm). The first via electrodes 18a1 (as hatched in the drawing) extend through the electrode laminate portion and are electrically connected to the first electrode layers 16a1 (as hatched in the drawing) while being electrically insulated from the second electrode layers 16a2 (as colored in black in the drawing). The second via electrodes 18a2 (as colored in black in the drawing) extend through the electrode laminate portion and are electrically connected to the second electrode layers while being electrically insulated from the first electrode layers. The residual laminate (114) was formed as follows: twenty-six first electrode layers 16a serving as internal electrodes and twenty-five second electrode layers 16a serving as internal electrodes were formed alternatingly while the ceramic layer 17 having a thickness of about 5 µm was sandwiched between the opposed first and second electrode layers 16a. Accordingly, the residual laminate (114) had a thickness of 350 µm while fifty ceramic layers 17 were laminated so that the internal electrode was sandwiched between opposed ceramic layers 17. In the laminated ceramic capacitors of Examples 1 to 13, the first dielectric portion (111), the partial laminate (112), and the second dielectric portion (113) were formed under the following conditions. In the residual laminate, the ceramic layer 17 (7 µm thick in Examples 1 to 13) that includes the capacitor back-side surface 10b is formed. In the present example, the second dielectric portion 112 has the function of absorbing an electrode-induced thickness differential. Accordingly, the ceramic layer 17 is not necessarily thick and is thus not included in the second dielectric portion 112, but is formed as part of the residual laminate.

EXAMPLE 1

The sample (laminated ceramic capacitor) of Example 1 was manufactured under the following conditions. The first dielectric portion (111) was formed only of the ceramic layer 17 and had a thickness of 10 µm. The partial laminate (112 was formed so as to include one ceramic layer 17 having a thickness of 5 µm, one first electrode layer, and one second electrode layer while the ceramic layer 17 was sandwiched between the first and second electrodes; and had a thickness of 7 µm. The thickness of the partial laminate (112) was the distance between the center of the first electrode layer with respect to the laminating direction and the center of the second electrode layer with respect to the laminating direction. The second dielectric portion (113) was formed only of the ceramic layers 17 without provision of internal electrodes and had a thickness of 20 mm.

EXAMPLES 2 AND 3

The samples of Examples 2 and 3 were manufactured while modifying the sample (laminated ceramic capacitor) of Example 1 such that the second dielectric portion (113) had a thickness of 40 µm and 70 µm.

EXAMPLES 4 AND 5

The samples of Examples 4 and 5 were manufactured while modifying the samples (laminated ceramic capacitors) of Examples 2 and 3 such that the partial laminate (112) included five ceramic layers and six internal electrodes and had a thickness of 35 µm. Specifically, the partial laminate (112) was formed such that three first electrode layers 16a serving as internal electrodes and three second electrode layers 16a serving as internal electrodes were formed alternatingly while the ceramic layer 17 having a thickness of about 5 µm was sandwiched between the opposed first and second electrode layers 16a.

EXAMPLES 6 AND 7

The samples of Examples 6 and 7 were manufactured while modifying the samples (laminated ceramic capacitors) of Examples 2 and 3 such that the partial laminate (112)

included nine ceramic layers and ten internal electrodes and had a thickness of 63 μm. Specifically, the partial laminate (112) was formed such that five first electrode layers 16a serving as internal electrodes and five second electrode layers 16a serving as internal electrodes were formed alternatingly while the ceramic layer 17 having a thickness of about 5 μm was sandwiched between the opposed first and second electrode layers 16a.

EXAMPLE 8

The sample of Example 8 was manufactured while modifying the sample (laminated ceramic capacitor) of Example 1 as follows: the second dielectric portion (113) was formed such that two first electrode layers and two second electrode layers were laminated alternatingly at spacings of 10 μm with the ceramic layer 17 sandwiched between the opposed first and second electrode layers; and had a thickness of about 50 μm.

EXAMPLE 9

The laminated ceramic capacitor of Modified Embodiment 2 (FIG. 9) had outside dimensions of 5.2 mm×5.2 mm as measured perpendicularly to the direction of lamination. The internal electrodes 16a had outside dimensions of 4.6 mm×4.6 mm. A total of 196 (14 in row×14 in column) via electrodes were formed. The via electrodes 18 were formed in such manner that the first via electrodes and the second via electrodes were arranged alternatingly at an equal pitch of 330 μm. The first via electrodes 18 (hatched in the drawing) extend through the electrode laminate portion and are electrically connected to the first electrode layers 16a (hatched in the drawing) while being electrically insulated from the second electrode layers 16a (colored in black in the drawing). The second via electrodes (colored in black in the drawing) extend through the electrode laminate portion (112A) and are electrically connected to the second electrode layers while being electrically insulated from the first electrode layers. The electrode laminate portion (112A) was formed as follows: twenty-six first electrode layers 16a serving as internal electrodes and twenty-five second electrode layers 16a serving as internal electrodes were formed alternatingly while the ceramic layer 17 having a thickness of about 5 μm was sandwiched between the opposed first and second electrode layers 16a. Accordingly, the electrode laminate portion (112A) had a thickness of 350 μm while fifty ceramic layers 17 were laminated in such manner that the internal electrode was sandwiched between opposed ceramic layers 17. In the present Example, the second dielectric portion was not formed interveningly in the electrode laminate portion; i.e., the second dielectric portion 113 having a thickness of 50 μm was formed on the side toward the capacitor back-side surface 10b (on a side of the electrode laminate portion opposite the first dielectric portion).

EXAMPLE 9

The samples (laminated ceramic capacitors) of Comparative Examples 1 to 7 were manufactured under the following conditions. The thickness of the first dielectric portion (111) was varied as shown in Table 1; the second dielectric portion was not formed interveningly in the electrode laminate portion; and the partial laminate (112) was not formed. Other conditions were identical with those of the sample of Example 1. In the case where the partial laminate is not formed, the residual laminate of the sample of Example 1 becomes the entire electrode laminate portion. Accordingly, the "thickness of residual laminate" in Table 1 below with respect to the Comparative Examples represents the thickness of the electrode laminate portion. Also, in the Comparative Examples, the ceramic layer 17 (7 μm) that includes the capacitor back-side surface 10b serves as the second dielectric portion.

The above-prepared samples were measured for inductance L by the following method. An automatically balanced bridge type impedance analyzer was used as a measuring device. Air coplanar type microprobes were brought into contact with corresponding surface electrodes of the laminated ceramic capacitor, to thereby establish electrical connection between the laminated ceramic capacitor and the measuring device. Capacitance C and self-resonant frequency fo were measured at a measuring frequency of 1 kHz. The inductance L was calculated by the formula $L=1/(4\cdot\pi^2\cdot f_o^2\cdot C)$.

Table 1 below shows inductance measurements with respect to the Examples and the Comparative Examples. In the case of Comparative Examples 1 and 2 in which the partial laminate (112) is not provided, and both of the first dielectric portion and the second dielectric portion are thin, an electrode-induced thickness differential cannot be sufficiently absorbed. As a result, in manufacture of samples, in the step of laminating sheets, a bonding defect arose, with a resultant failure to manufacture samples free from a defective structure. In comparative Examples 3 to 8, an electrode-induced thickness differential can be sufficiently absorbed by virtue of the first dielectric portion; however, in comparison with Examples 1 to 9 in which the partial laminate (112) is provided, portions of vias that extend through the first dielectric portion are long, resulting in high inductance. Accordingly, inductance could be reduced by means of imparting to the second dielectric portion a sufficient thickness to sufficiently absorb an electrode-induced thickness differential, and reducing the thickness of the first dielectric portion. Comparative Examples 3 to 7, in which the first dielectric portion (111) has a thickness of 20 mm or greater (not less than four times the spacing between internal electrodes), tend to increase in inductance, since the via electrode length becomes long.

TABLE 1

| | Thickness of First Dielectric Portion (111) | Thickness of Partial Laminate (112) | Thickness of Second Dielectric Portion (113) | Thickness of Residual Laminate (114) | Inductance |
|---|---|---|---|---|---|
| Example 1 | 10 μm | 7 μm | 20 μm | 350 μm | 1.02 pH |
| Example 2 | 10 μm | 7 μm | 40 μm | 350 μm | 1.12 pH |
| Example 3 | 10 μm | 7 μm | 70 μm | 350 μm | 1.37 pH |
| Example 4 | 10 μm | 35 μm | 40 μm | 350 μm | 0.85 pH |
| Example 5 | 10 μm | 35 μm | 70 μm | 350 μm | 1.13 pH |
| Example 6 | 10 μm | 63 μm | 40 μm | 350 μm | 0.64 pH |
| Example 7 | 10 μm | 63 μm | 70 μm | 350 μm | 0.88 pH |
| Example 8 | 10 μm | 7 μm | 50 μm (internal electrodes provided) | 350 μm | 1.21 pH |
| Example 9 | 10 μm | — | 50 μm (located on a side toward back side) | 350 μm (*) | 0.84 pH |
| Comparative Example 1 | 10 μm | — | 7 μm | 350 μm (*) | unable to manufacture |

TABLE 1-continued

|  | Thickness of First Dielectric Portion (111) | Thickness of Partial Laminate (112) | Thickness of Second Dielectric Portion (113) | Thickness of Residual Laminate (114) | Inductance |
|---|---|---|---|---|---|
| Comparative Example 2 | 19 μm | — | 7 μm | 350 μm (*) | unable to manufacture |
| Comparative Example 3 | 37 μm | — | 7 μm | 350 μm (*) | 1.86 pH |
| Comparative Example 4 | 57 μm | — | 7 μm | 350 μm (*) | 2.00 pH |
| Comparative Example 5 | 87 μm | — | 7 μm | 350 μm (*) | 2.34 pH |
| Comparative Example 6 | 115 μm | — | 7 μm | 350 μm (*) | 2.81 pH |
| Comparative Example 7 | 143 μm | — | 7 μm | 350 μm (*) | 3.43 pH |

(*for Example 9 and Comparative Examples 1 to 7): When the partial laminate is absent, "thickness of residual laminate" refers to "thickness of electrode laminate portion."

While the invention has been described in detail and with reference to specific embodiments thereof, it will be apparent to one skilled in the art that various changes and modifications can be made therein without departing from the spirit and scope thereof.

This application is based on Japanese Patent Application No. 2003-407327 filed Dec. 5, 2003, incorporated herein by reference in its entirety.

What is claimed is:

1. A capacitor including an electrode laminate portion in which a plurality of internal electrodes are arranged in layers with a dielectric layer sandwiched between opposed internal electrodes, and configured such that via electrodes extending in a laminating direction of the internal electrodes electrically and alternately interconnect the internal electrodes, the capacitor comprising:

a first dielectric portion comprising a dielectric layer; and
a second dielectric portion comprising a dielectric layer;
wherein the electrode laminate portion comprises a laminate of first electrode layers, second electrode layers, and interelectrode dielectric layers, the first electrode layers and the second electrode layers serving as the first and second internal electrodes, respectively, and the interelectrode dielectric layers serving as the dielectric layers sandwiched between the first and second electrodes;
the first dielectric portion overlies the electrode laminate portion on a side of the electrode laminate portion toward a front surface of the capacitor;
the second dielectric portion overlies the electrode laminate portion, in which the first electrode layers, the second electrode layers, and the interelectrode dielectric layers are laminated, the second dielectric portion being located away from the first dielectric portion such that at least part of the electrode laminate portion intervenes between the first dielectric portion and the second dielectric portion; and the second dielectric portion has a thickness which mitigates a thickness differential occurring in the electrode laminate portion as a result of lamination of the first and second electrode layers;
the first dielectric portion has a thickness which contributes toward reducing inductance of the capacitor; and first and second via electrodes extend from the first dielectric portion to electrically interconnect the first and second electrode layers, respectively, in the electrode laminate portion.

2. The capacitor as claimed in claim 1, wherein the second dielectric portion has a thickness of at least 5% of an overall thickness of the electrode laminate portion.

3. The capacitor as claimed in claim 1, wherein the first dielectric portion is thicker than a single interelectrode dielectric layer in the electrode laminate portion and thinner than 20 times the thickness of a single interelectrode dielectric layer.

4. The capacitor as claimed in claim 1, wherein the second dielectric portion is present within the electrode laminate portion and is biased toward the front surface of the capacitor; and the electrode laminate portion comprises a partial laminate located at a position biased toward the front surface of the capacitor, and a residual laminate located at a position biased toward a back surface of the capacitor.

5. The capacitor as claimed in claim 4, wherein the second dielectric portion is thicker than the partial laminate.

6. The capacitor as claimed in claim 4, wherein the second dielectric portion has a thickness that is not greater than ⅓ an overall thickness of the capacitor.

7. A capacitor joined to a semiconductor device, wherein a capacitor as claimed in claim 1 is connected, on a side associated with the first dielectric portion, to the semiconductor device such that the via electrodes of the capacitor are electrically connected to the semiconductor device.

8. A capacitor united with a wiring board, wherein a capacitor as claimed in claim 1 is connected, on a side associated with the first dielectric portion, to the wiring board having conductor lines including power lines and ground lines, such that the via electrodes of the capacitor are electrically connected to the wiring board.

9. A capacitor united with a substrate, wherein a capacitor as claimed in claim 1 is connected, on a side opposite the first dielectric portion, to the substrate having conductor lines including power lines and ground lines, such that the via electrodes of the capacitor are electrically connected to the substrate.

10. A capacitor including an electrode laminate portion in which a plurality of internal electrodes are arranged in layers with a dielectric layer sandwiched between opposed internal electrodes, and configured such that via electrodes extending in a laminating direction of the internal electrodes electrically and alternately interconnect the internal electrodes, the capacitor comprising:

a first dielectric portion comprising a dielectric layer; and
a second dielectric portion comprising a dielectric layer;
wherein the electrode laminate portion comprises a laminate of first electrode layers, second electrode layers, and interelectrode dielectric layers, the first electrode layers and the second electrode layers serving as the internal electrodes, and the interelectrode dielectric layers serving as the dielectric layers sandwiched between the first and second electrodes;
the first dielectric portion overlies the electrode laminate portion on a side of the electrode laminate portion toward a front surface of the capacitor;
the second dielectric portion is present within the electrode laminate portion and is biased toward the front surface of the capacitor;
the electrode laminate portion comprises a partial laminate located at a position biased toward the front surface of the capacitor, and a residual laminate located at a position biased toward a back surface of the capacitor; and the via electrodes comprise first via electrodes and second via electrodes which extend from the first dielectric portion through the first electrode layers and through the second electrode layers in the electrode laminate portion.

11. The capacitor as claimed in claim 10, wherein the second dielectric portion has a thickness of at least 5% of an overall thickness of the electrode laminate portion.

12. The capacitor as claimed in claim 10, wherein the first dielectric portion is thicker than a single interelectrode dielectric layer in the electrode laminate portion and thinner than 20 times a thickness of the single interelectrode dielectric layer.

13. The capacitor as claimed in claim 10, wherein the second dielectric portion is thicker than the partial laminate.

14. A capacitor joined to a semiconductor device, wherein a capacitor as claimed in claim 10 is connected, on a side associated with the first dielectric portion, to the semiconductor device such that the via electrodes of the capacitor are electrically connected to the semiconductor device.

15. A capacitor united with a wiring board, wherein a capacitor as claimed in claim 10 is connected, on a side associated with the first dielectric portion, to the wiring board having conductor lines including power lines and ground lines, such that the via electrodes of the capacitor are electrically connected to the wiring board.

16. A capacitor united with a substrate, wherein a capacitor as claimed in claim 10 is connected, on a side opposite the first dielectric portion, to the substrate having conductor lines including power lines and ground lines, such that the via electrodes of the capacitor are electrically connected to the substrate.

17. A method for manufacturing a capacitor including an electrode laminate portion in which a plurality of internal electrodes are arranged in layers with a dielectric layer sandwiched between opposed internal electrodes, and configured such that via electrodes extending in a laminating direction of the internal electrodes electrically and alternately interconnect the internal electrodes, the method comprising:

a step (1) of forming a first dielectric portion from a dielectric material thicker than a single dielectric layer intervening between the internal electrodes in the electrode laminate portion;

a step (2) of laminating internal-electrode formation materials, which are to become the internal electrodes, such that internal-electrode formation material which is to become a first electrode layer alternates with the internal-electrode formation material which is to become a second electrode layer while a dielectric material which is to become the dielectric layer is sandwiched therebetween, so as to form a partial laminate which is to become a portion of the electrode laminate portion, and overlaying the partial laminate on the first dielectric portion;

a step (3) of overlaying on the partial laminate, as a second dielectric portion, a dielectric material which is to become a dielectric layer;

a step (4) of laminating internal-electrode formation materials, which are to become the internal electrodes, such that internal-electrode formation material which is to become the first electrode layer alternates with the internal-electrode formation material which is to become the second electrode layer while the dielectric material which is to become the dielectric layer is sandwiched therebetween, so as to form a residual laminate which is to become a residual portion of the electrode laminate portion, and overlaying the residual laminate on the second dielectric portion; and a step (5) of forming through holes each extending through the first electrode layers, and through holes each extending through the second electrode layers, in the partial laminate and the residual laminate in a laminated assembly of the first dielectric portion, the partial laminate, the second dielectric portion, and the residual laminate; and charging a conductive paste into the through holes.

18. A method for manufacturing a capacitor including an electrode laminate portion in which a plurality of internal electrodes are arranged in layers with a dielectric layer sandwiched between opposed internal electrodes, and configured such that via electrodes extending in a laminating direction of the internal electrodes electrically and alternately interconnect the internal electrodes, the method comprising:

a step (1) of forming a first dielectric portion from a dielectric material thicker than a single dielectric layer intervening between the internal electrodes in the electrode laminate portion;

a step (2) of laminating internal-electrode formation materials, which are to become internal electrodes, such that the internal-electrode formation material which is to become a first electrode layer alternates with the internal-electrode formation material which is to become a second electrode layer while a dielectric material which is to become the dielectric layer is sandwiched therebetween, so as to form a laminate which is to become the entire electrode laminate portion, and overlaying the laminate on the first dielectric portion;

a step (3) of overlaying on the laminate, as a second dielectric portion, a dielectric material which is to become a dielectric layer; and a step (4) of forming through holes each extending from the first dielectric portion and through the first electrode layers, and forming through holes each extending from the first dielectric portion and through the second electrode layers, in the laminate in a laminated assembly of the first dielectric portion, the laminate, and the second dielectric portion; and charging a conductive paste into the through holes.

19. A laminated ceramic capacitor comprising:

a first laminate comprising a first ceramic layer;

a second laminate comprising a second ceramic layer and first internal electrodes sandwiching the second ceramic layer;

a third laminate comprising a third ceramic layer and second internal electrodes;

a fourth laminate comprising a fourth ceramic layer and third internal electrodes sandwiching the fourth ceramic layer; and via electrodes extending through at least the second laminate, the third laminate and fourth laminate and alternately interconnecting the first, second and third internal electrodes, wherein the first laminate overlies the second laminate, the second laminate overlies the third laminate, and the third laminate is sandwiched by the second and fourth laminates, and wherein a thickness of the ceramic layer of the third laminate is about 2 to 20 times that of the ceramic layer of the second and fourth laminates.

20. The laminated ceramic capacitor as claimed in claim 19, wherein the ceramic layer of the third laminate is sandwiched by the second internal electrodes.

21. A laminated ceramic capacitor comprising:
a first laminate comprising a first ceramic layer;
a second laminate comprising a second ceramic layer and first internal electrodes sandwiching the second ceramic layer;
a third laminate comprising a third ceramic layer;
a fourth laminate comprising a fourth ceramic layer and second internal electrodes sandwiching the fourth ceramic layer; and
via electrodes extending through at least the second laminate, the third laminate and fourth laminate and alternately interconnecting the first and second internal electrodes;
wherein the first laminate overlies the second laminate, the second laminate overlies the third laminate, and the third laminate is sandwiched by the second and fourth laminates, and
wherein a thickness of the ceramic layer of the third laminate is about 2 to 20 times that of the ceramic layer of the second and fourth laminates.

* * * * *